United States Patent [19]

Nossen

[11] Patent Number: 4,669,091
[45] Date of Patent: May 26, 1987

[54] ADAPTIVE MULTIPATH DISTORTION EQUALIZER

[75] Inventor: Edward J. Nossen, Cherry Hill, N.J.

[73] Assignee: RCA Corporation, Princeton, N.J.

[21] Appl. No.: 827,740

[22] Filed: Feb. 10, 1986

[51] Int. Cl.[4] ............................................. H04B 1/12
[52] U.S. Cl. ...................................... 375/14; 375/47; 375/50; 375/51; 375/102; 455/65; 455/305
[58] Field of Search ...................... 370/21; 455/46, 42, 455/65, 303, 305; 375/14, 43, 47, 50, 51, 58, 101, 102

[56] References Cited

U.S. PATENT DOCUMENTS

| | | | |
|---|---|---|---|
| 3,445,771 | 5/1969 | Clapham et al. | 325/42 |
| 3,621,139 | 11/1971 | Gibson | 371/6 |
| 3,997,841 | 12/1976 | Borowski | 375/11 |
| 4,152,657 | 5/1979 | Robers et al. | 328/165 |
| 4,243,956 | 1/1981 | Lemoussu et al. | 333/18 |
| 4,417,317 | 11/1983 | White et al. | 364/825 |
| 4,457,007 | 6/1984 | Gutleber | 455/65 |
| 4,481,643 | 11/1984 | Kitazawa | 375/12 |
| 4,519,084 | 5/1985 | Langseth | 375/14 |
| 4,547,888 | 10/1985 | Ryan et al. | 375/14 |
| 4,555,789 | 11/1985 | Hogge, Jr. | 375/11 |
| 4,555,790 | 11/1985 | Betts et al. | 375/39 |
| 4,567,599 | 1/1986 | Mizoguchi | 375/14 |

OTHER PUBLICATIONS

"The Multipath Phenomenon in Line-of-Sight Digital Transission Systems," by E. W. Allen, published at pp. 215–225, of the May 1984 Microwave Journal.

"Digital Communications", by John Proakis, published by McGraw-Hill, 1983, pp. 410–412.

"Digital HF Radio: A Sampling of Techniques," presented & distributed at the 3rd International Conferences on HF Communication System and Techniques, London, Feb. 26, 1985, authored by Ulrich Rhode and also published in Ham Radio Magazine, April 1985, vol. 18, No. 4.

Primary Examiner—Benedict V. Safourek
Attorney, Agent, or Firm—Clement A. Berard, Jr.; Robert L. Troike; William H. Meise

[57] ABSTRACT

A communication system transmits information which may be in the form of frames or bursts of suppressed-carrier data over a dispersive transmission path which introduces multipath distortion. Each frame is stored as it is received and processed by iteratively simulating the multipath distortion, subtracting the distortion from the stored frame to form a corrected signal, and evaluating the quality of the resulting signal. The quality of the resulting signal is determined by frequency multiplying the corrected signal and evaluating the total power of components other than the frequency multiplied carriers. The iterative procedure adjusts the phase and, if deisred, the amplitude of signals tapped from a delay line.

20 Claims, 32 Drawing Figures

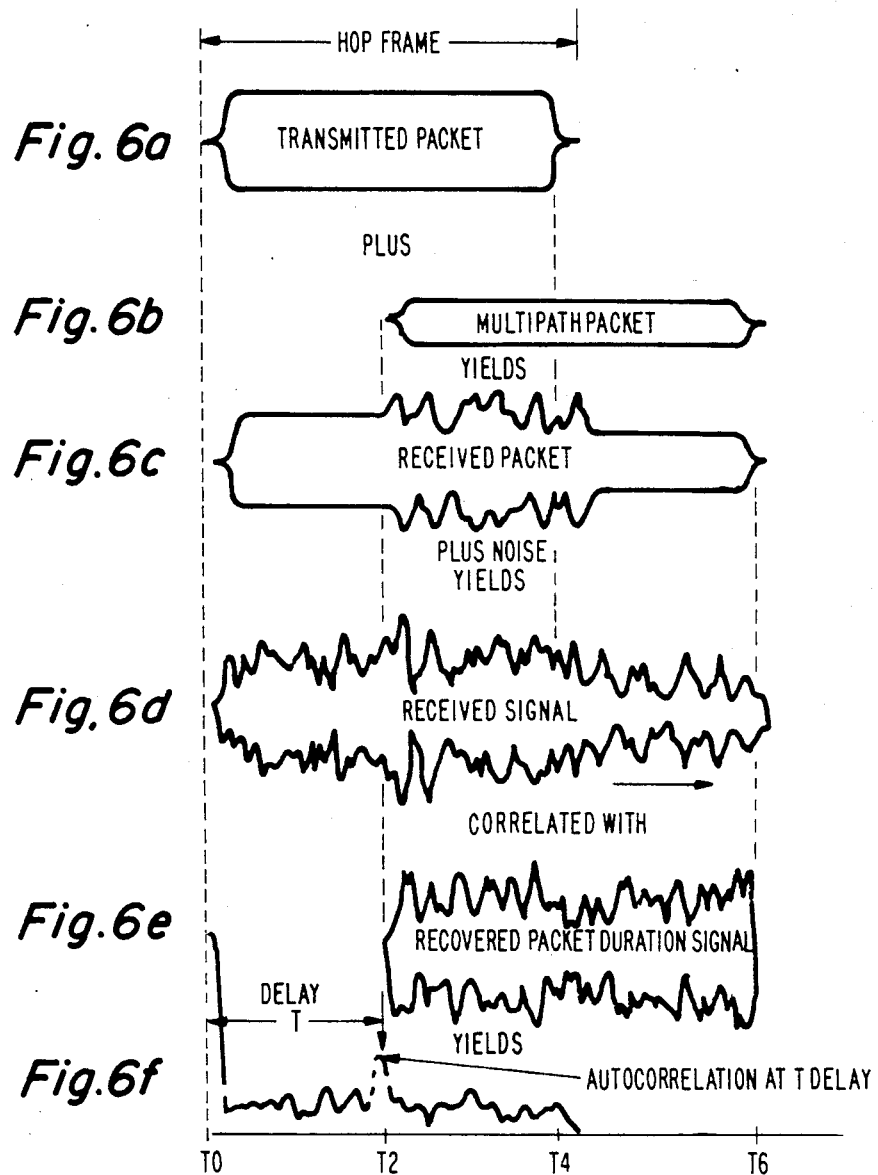

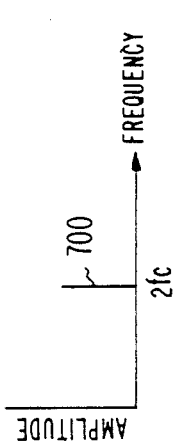
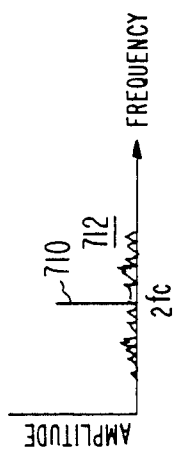
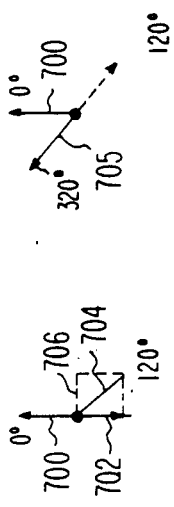
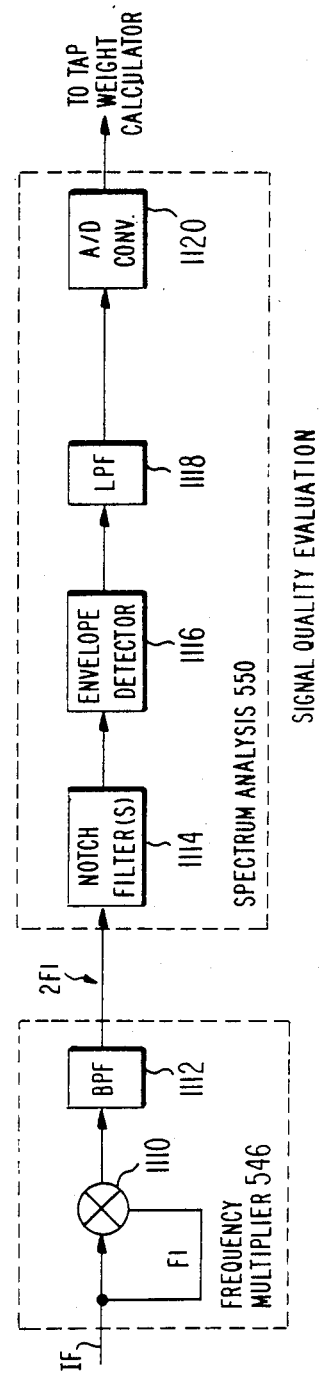

ADAPTIVE MULTIPATH DISTORTION EQUALIZER

The Government has rights to this invention pursuant to Contract No. DAAB07-83-C-K573 awarded by the Department of the Army.

This invention relates to digital communication over dispersive communication channels subject to multipath distortion, and more particularly to an adaptive multipath distortion equalizer for burst communications.

BACKGROUND OF THE INVENTION

Digital communication channels are in widespread use for data communications. A major advantage of a digital signal format is the reliability provided by the binary nature of the digital signals of communications in the presence of noise and interference. Digital data communication often occurs over communication channels which are dispersive or include multiple signal paths. As known, such dispersive channels produce multipath distortion of signals passing therethrough. The multipath distortion results from differences among the effective path lengths, phase shifts and attenuations of the various signal paths in the communication channel.

Ionospheric-scatter communications systems or channels are dispersive, and are often used for communication. In a ionospheric-scatter communication system, signals are transmitted from a ground station and reflected or partially reflected from one or more layers of the ionosphere, and are received by another ground station at a distance from the first. In ionospheric-scatter systems, the multiple paths arise due to the different altitudes of the reflecting layers from which the signal is "bounced". Similar problems arise in underwater acoustic communication systems, in which thermoclines or layers having different temperature characteristics also have slightly different propagation characteristics which result in multiple reflections and paths. Ionospheric-scatter and acoustic paths change with time as the various layers form, dissipate and change altitude. Multipath distortion also occurs in fixed cable systems such as in telephone systems, due to the presence of hybrids provided for the purpose of directing the signals. Unlike the ionospheric-scatter and acoustic communication systems, the multipath distortions in a cable system do not ordinarily change with time.

Multipath distortion can severely disrupt or totally interrupt digital communications. This is readily understood by considering that digital communication is in the form of a sequence of binary logic high and logic low levels which must be distinguished from each other. The superposition of several mutually delayed replicas of the signal makes it likely that a logic low level will be obliterated by the superposed logic high levels of one or more of the delayed replicas of the signal. Thus, it becomes difficult or impossible to distinguish a logic high level from a logic low level, and the data cannot be decoded.

It is known to equalize or to correct for multipath distortion by passing the signal received from the dispersive communication path or channel through a tapped delay line. The taps of the delay line are located at points providing delays selected to be equal to the various delays experienced by the signal in passing through the dispersive communication path. Thus, each of the taps of the tapped delay line generates a delayed replica of the received signal, in which the delay corresponds to the delay of one multipath distortion component. The outputs of the various taps are summed to produce an approximation of the distortion components contained in the received signal. The distortion components are subtracted from the received signal to produce an equalized signal substantially free of multipath distortion.

A known procedure for adjusting such an equalizer involves demodulating the received signal to baseband, and observing the received signal on an oscilloscope synchronized with the data rate. On such a display, the logic high and the logic low levels form the upper and lower edges of a pattern known as an "eye". The presence of multipath distortion tends to "close" the "eye". The delays of the taps of the equalizer, the phase shifts of the signals so tapped, and their attenuation is adjusted so as to maximize the opening of the "eye". This well-known procedure is very suitable for fixed communication channels in which the setting of the taps, once established, does not require frequent adjustment. However, for communication paths which are in continuing state of flux, as for example the aforementioned ionospheric-scatter communication systems, manual control of the taps is not very satisfactory.

Dispersive channels which change with time require continuous adjustment of the equalizer parameters. It is known to determine the characteristics of the multipath distortion to provide a basis for adjustment of the equalizer by periodically transmitting a predetermined training signal instead of data. This is a time division multiplex of the training signal with the data. The known characteristic of the training signal allows the characteristics of the multipath distortion to be evaluated. The use of a training signal is disadvantageous because the multiplexed training signal represents overhead which reduces the data capacity of the system. One type of training signal is a predetermined data signal inserted periodically into the transmitted data. In television systems, a training signal may be periodically inserted during blanking intervals, which are required for reasons other than training. Data communication systems which use quadrature modulation (two distinct data channels phase modulated onto a carrier in mutual phase quadrature) can provide a continuous training signal on the quadrature (Q) channel together with continuous data on the inphase (I) channel, thereby providing the capability of rapid update of the equalizer. Such a system, however, also represents the use of significant overhead (the Q channel) for a training signal, which might otherwise be used for the transmission of data. In some contexts, the use of overhead for training signals is undesirable. When a data communications service is provided by a common carrier, it is undesirable that the common carrier be required to decode the data in order to identify a time division multiplexed training signal contained therein.

The problem of control of a multipath distortion correcting equalizer is compounded when the data communication is by means of data bursts. Data bursts are common in random access contention type communication systems, and also in frequency hopping communication systems. Where the data receiver receives the communication in discrete short bursts, the use of training signals may be totally unacceptable because of the adverse impact on the effective data rate. A multipath distortion equalizer system is desirable which is capable of correcting multipath distortion in a burst communications system without knowledge of the data content of the signal passing through the system.

SUMMARY OF THE INVENTION

A method and apparatus for equalizing suppressed carrier burst communications transmitted over a transmission path subject to multipath distortion includes storing each received burst, including a undistorted portion and a distorted portion, to form stored burst signals. The stored burst signals are autocorrelated to establish the multipath delay. Delayed signals are generated which represent (replicate) the multipath delayed signals. The replica of the multipath delayed signals is subtracted from the stored received signal, to produce a distortion corrected signal. The distortion corrected signal is frequency multiplied to reconstitute carrier spectral components and other spectral components. The phase shift and, if desired, the amplitude of the delayed multipath replica are adjusted to minimize the magnitude of the other spectral components. Finally, the stored received signal is corrected by subtracting therefrom the delayed multipath replica phase-shifted by the amount required to minimize the other spectral components.

DESCRIPTION OF THE DRAWING

FIGS. 6a–6f illustrate the composition of a received frequency hopped burst including a multipath component, and the result of autocorrelation;

FIGS. 7a–7f illustrate biphase signals received with and without multipath distortion, and vector representations of the effect of frequency doubling, and the frequency spectrum resulting therefrom;

FIG. 11 is a block diagram of a frequency multiplier and spectrum analysis arrangement useful in the arrangement of FIG. 5;

FIG. 13a is an overall flowchart illustrating the operation of a tap weight calculator and control circuit useful in the arrangement of FIG. 5, and FIGS. 13b, 13c and 13d are detailed flowcharts of portions of the flowchart of FIG. 13a.

DESCRIPTION OF THE INVENTION

Figure 1:
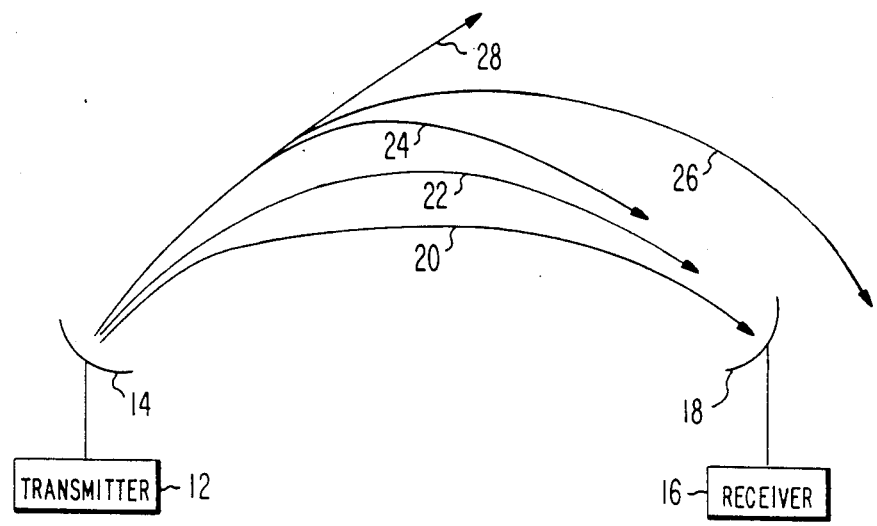
FIG. 1 is a block diagram of a communication system including a transmitter and receiver communicating over a dispersive transmission path.

FIG. 1 illustrates a communication system including a transmitter 12 coupled to an antenna 14 for transmitting signals to a receiver 16 having an antenna 18. As illustrated, the transmission path is dispersive, in that it includes a plurality of paths between antennas 14 and 18, three of which are illustrated as 20, 22, and 24. Such a situation is characteristic of a ionospheric scatter system, in which shortest path 20 represents partial reflection of the signal by the lowermost reflecting layer of the ionosphere, path 22 represents a partial reflection at a higher altitude of that portion of the signal which does not take path 20, and path 24 represents a further path taken by at least a portion of the signals which do not flow to the receiver by paths 20 and 22. As known, some of the signal may not reach the receiver at all, either because the reflective path does not reach antenna 18, as illustrated by path 26, or because there is no reflection whatever, so the signal is lost in space, as illustrated by path 28.

Ordinarily, shortest path 20 has the least signal attenuation, and so a transmitted signal arrives at antenna 18 by path 20 before the signal arriving by other paths, and with the greatest amplitude. Thus, the signal taking the shortest path arrives first and has the highest amplitude, and may be considered the "main" received signal. The signals received by paths 22 and 24 are delayed relative to the main signal and are generally smaller in amplitude. Thus, the signals received by paths 22 and 24, and by other paths not illustrated, represent delayed signals which are superimposed upon the main signal and which distort the main signal.

Figure 2:
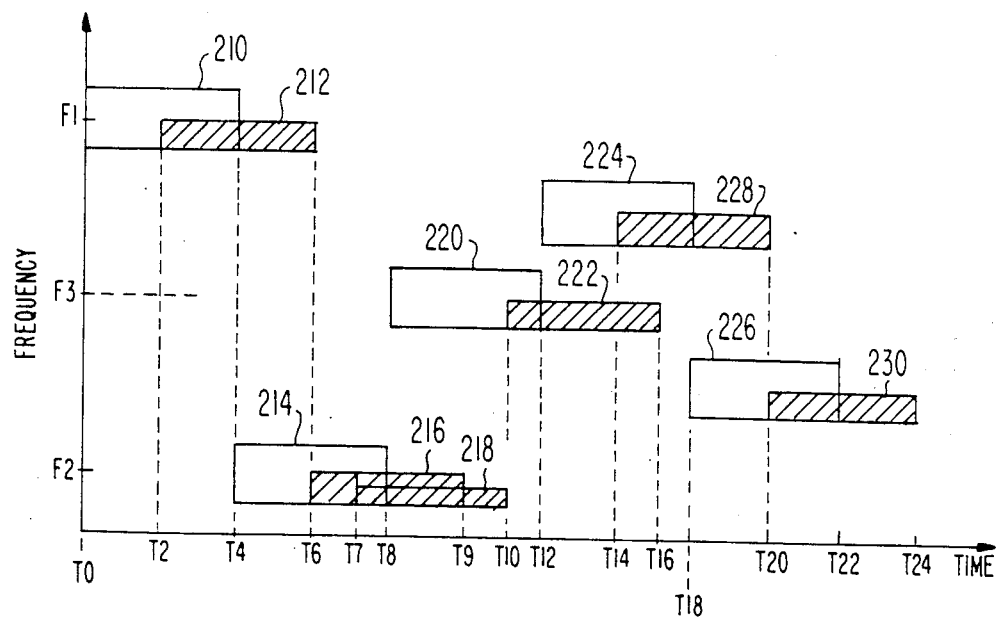
FIG. 2 is a frequency-time plot of communications over a frequency hopped communication system illustrating the effect of a dispersive transmission path.

FIG. 2 is a frequency versus time plot of the signals transmitted in a frequency hopping system. A frequency hopping system is a type of spread spectrum communication system. Such systems are advantageous for reducing the effects of interference arising from other transmitters, and for resisting the effects of fading at selected frequencies. In FIG. 2, the interval T0–T4 represents an interval in which a burst (packet) of data or information (represented as block 210) at a frequency F1 is received at antenna 18 (FIG. 1) by way of path 20. At frequency F1, only main path 20 and a single longer path 22 of the transmission path are effective. Path 24 is not available at frequency F1. In the interval T0–T2, only the originally transmitted information is received, free of multipath distortion. Beginning at time T2, a delayed replica 212 of data burst 210 of information is received by way of path 22. As illustrated in FIG. 2, delayed replica 212 is smaller in the vertical dimension than burst 210. The relative vertical amplitudes of the bursts as illustrated is selected to allow them to be clearly distinguished, and has no significance. The additional delay (T0–T2) imposed by path 22 amounts to approximately one-half the duration of information burst 210. At time T4, the end of burst 210 is received. Even though data burst 210 ends at time T4, multipath burst 212 at frequency F1 continues to arrive at antenna 18 by way of path 22 until a later time T6. Also at time T4, reception of a main burst signal 214 begins at a lower frequency F2. At frequency F2, paths 20, 22, and 24 as illustrated in FIG. 1 are effective. The main signal received at frequency F2 beginning at time T4 is uncontaminated by multipath signals in the interval T4–T6, because there are no earlier transmissions from transmitter 12 (FIG. 1) at frequency F2 which could interfere with reception of burst 214. Beginning at time T6, a multipath component illustrated as 216 begins to arrive by path 22. Shortly thereafter, at time T7, a second multipath component 218 begins to arrive by way of path 24. Since each multipath component has a duration equal to the duration of the data bursts arriving by the main transmission path 20, multipath distortion components 216 and 218 each have a duration equal to the duration of data burst 214. Thus, multipath distortion component 216 arrives at time T6 and ends at time T9, and multipath distortion component 218 begins at time T7 and ends at a later time T10. The total interval during which multipath distortion components arrive at frequency F2 extends from time T6 until time T10, which is a duration greater than the duration of data bursts 214. However, as illustrated, time T10 follows time T8 at which data bursts 214 ends by less than the duration of data burst 214.

Beginning at time T8 at which reception of data burst 214 at frequency F2 ends, reception begins of further main data burst 220 arriving by way of path 20 at a frequency F3. At frequency F3, main path 20 and multipath 24 of the transmission path of FIG. 1 are active, and multipath 22 is unavailable. Consequently, main data burst 220 is received without distortion in the interval T8–T10, and is distorted in the interval T10–T12 by multipath component 222. Other frequency hopped main data bursts 224, 226 and their associated multipath components 228, 230 are illustrated. It should be noted that the timing illustrated in FIG. 2 is somewhat idealized, since the main path lengths and the multipath lengths will vary from frequency to frequency, so that the end of reception of signal at one frequency will not necessarily coincide with the beginning of reception at another frequency. For example, if main path 20 of FIG. 1 is shorter (has a shorter delay) at frequency F1 than frequency F2, the time at which reception of data burst 210 ends will be earlier than time T4, and the time at which reception of data burst 214 begins at frequency F2 will be somewhat later than time T4.

Figure 3:
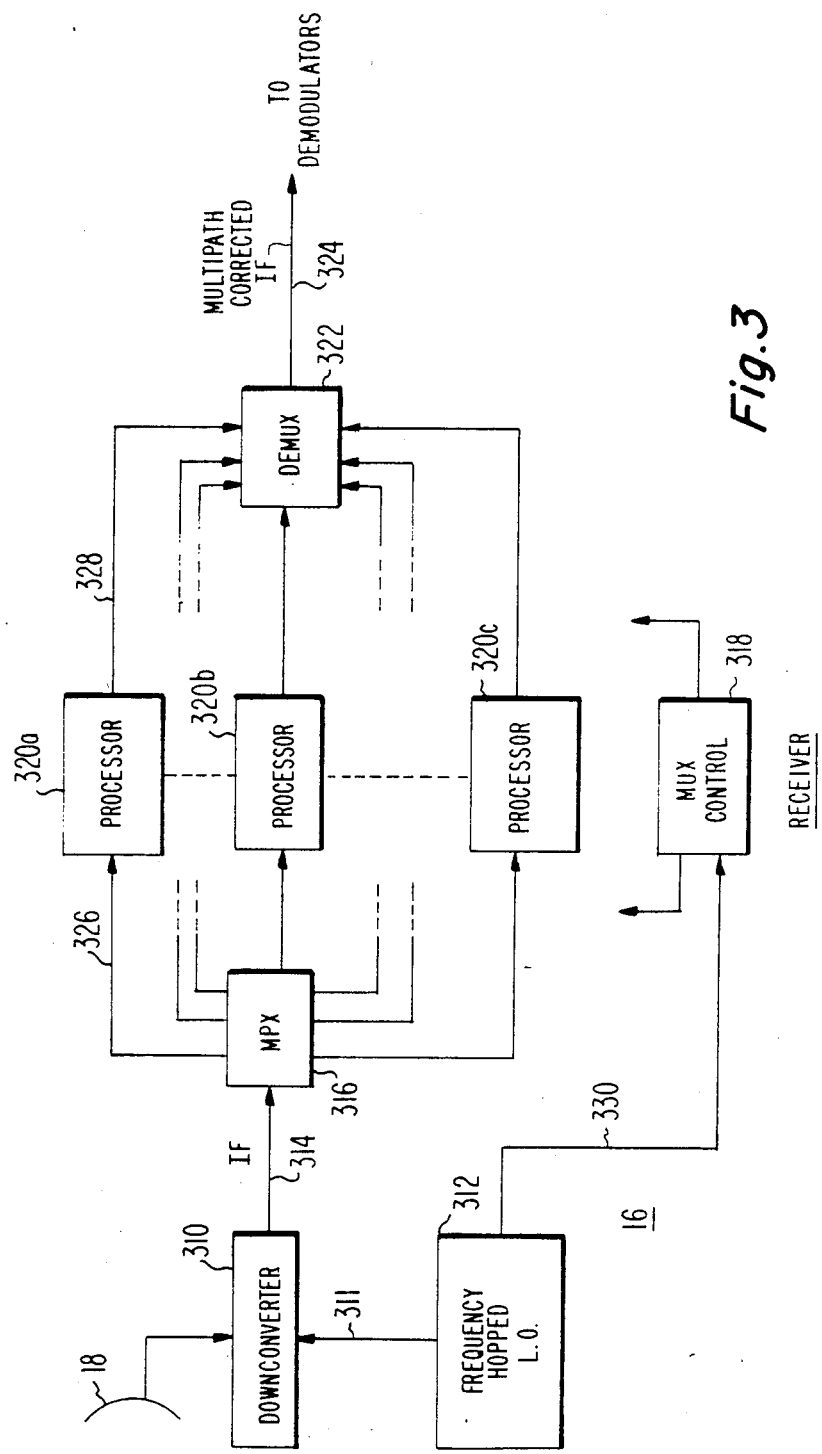
FIG. 3 is a block diagram of the receiver of FIG. 1 in accordance with an embodiment of the invention.

FIG. 3 is a block diagram of receiver 16 of FIG. 1 arranged according to an embodiment of the invention for equalization or compensation for multipath distortion according to the method of the invention. In FIG. 3, elements corresponding to those of FIG. 1 are designated by the same reference numeral. In FIG. 3, antenna 18 receives frequency hopped bursts of signal such as those illustrated in FIG. 2, and couples them to a downconverter 310. Downconverter 310 receives a frequency hopped local oscillator signal from a block 312, which converts each of the bursts of data at its received frequency into a single IF signal at an IF frequency. The IF signal may be decomposed into an In-phase (I) component and an Quadrature (Q) component at baseband to facilitate processing. Subsequently, the I and Q components may be recombined to recreate an IF signal on the intermediate frequency carrier. The choice depends on frequency, data rate and dispersion characteristics, and on the relative processing speeds available in analog or digital domains. In the FIGURES, signals may be in serial or parallel form carried by a single conductor or by a conductor set. Since this is well known in the art, all conductor sets are described as though they are single conductors. The IF signal is coupled over a conductor 314 to a multiplexer 316 which is controlled by a multiplex control circuit illustrated as 318. Control circuit 318 operates at the hop rate to couple each burst of received data (and at least a portion of its multipath components) in sequence to one or more identical signal processors 320a–320c. Each received burst is processed by one of the processors 320, and when processing of each burst is complete, the equalized burst of IF signal is applied to a demultiplexer 322, also under the control of multiplex control circuit 318, to produce a continuous stream of multipath distortion corrected IF signals on a conductor 324. The corrected signals are applied to demodulators (not illustrated) or to other signal processing which is not a part of the invention.

Figure 4:
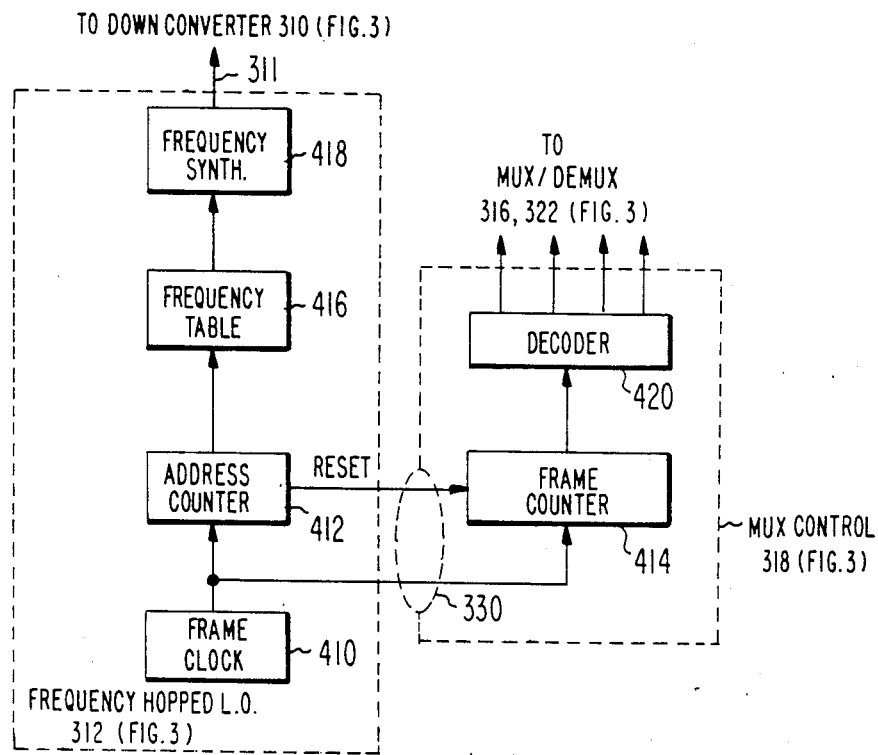
FIG. 4 is a block diagram of frequency hopping local oscillator and multiplex control circuits useful in the arrangement of FIG. 3.

FIG. 4 is a more detailed block diagram of the frequency hopped local oscillator (L.O.) 312 and multiplex control circuit 318 of FIG. 3, In FIG. 4 a frame clock 410 advances an address counter 412 and a frame counter 414 for each new frequency burst. Frequency synchronization of the receiver with the received signals is accomplished in known fashion by synchronizing apparatus (not illustrated), and is not a part of the invention. Address counter 412 addresses a memory 416 to select one of a plurality of numbers from a frequency table stored in memory 416, which controls a frequency synthesizer 418. A desired frequency is thus selected for each burst from a family of stored frequency numbers in memory 416. The size of address counter 412 depends on the number of entries in the table. The frame clock also advances frame counter 414. Periodically, frame counter 414 is reset as the address counter recycles to assure synchronism between counters, regardless of start up conditions. The contents of frame counter 414 are decoded by a decoder 420 to provide a control line for each multiplexer and demultiplexer channel. The frame counter size depends on the number of parallel processors 320 needed to accomplish the equalization.

Figure 5:
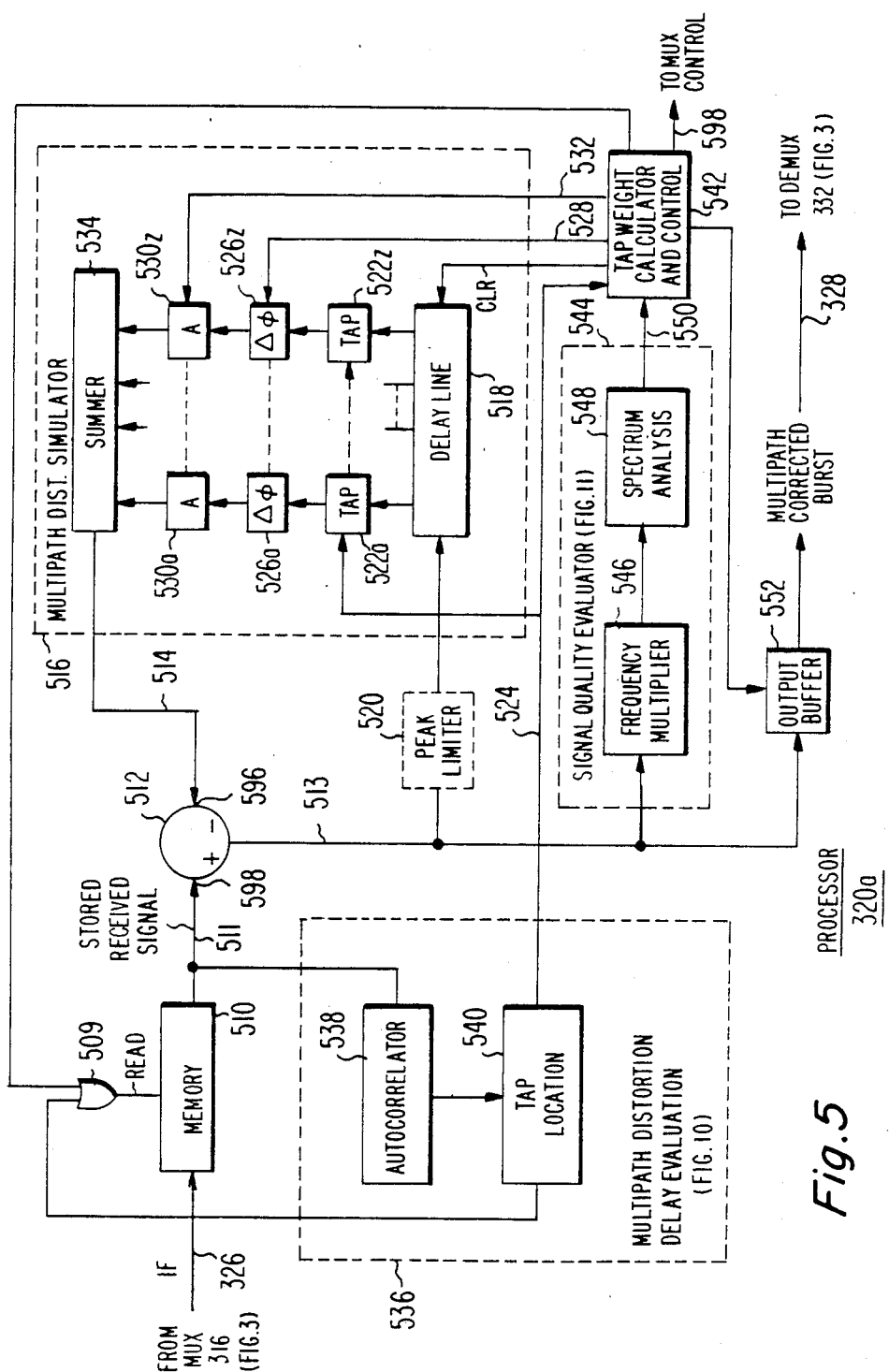
FIG. 5 is block diagram of a signal processor useful in the arrangement of FIG. 3.

FIG. 5 is a block diagram of processor 320a of FIG. 3. Elements of FIG. 5 corresponding to those of FIG. 3 are designated by the same reference numeral. Processor 320a receives over a conductor 326 from multiplex circuit 316 (FIG. 3) a stream of signals beginning at a time just before the earliest expected time of arrival of the main data burst. Memory 510 receives the main data burst signals and associated multipath components from conductor 326, and stores them for later use. During an initial signal acquisition and system synchronization period, memory 510 continues to store the multipath signals received for a predetermined duration after reception of the main portion of the burst ends. It has been found that storing the burst signals received after the end of the data burst for duration equal to the duration of the data burst provides satisfactory operation of the correlator described below during initial acquisition after. After signal acquisition, it is not necessary to store those multipath signals which are received after the main portion of the burst ends. In order to avoid the need for excess memory and processing circuits, it has been found to be possible during signal acquisition to store signal for the duration of one burst and the multipath signal received for another burst duration thereafter simply by skipping alternate burst signals and spending two burst periods on a single frequency. This is permissible while synchronizing the receiver to the hop frames, but is not needed during subsequent data reception. Processor 320a processes each data burst received over conductor 326 and its multipath distortion components to produce an IF signal on an output conductor 328 which is essentially free of multipath distortion. It will be noted that demodulation of the signal does not occur within processor 320a and that distortion correction is performed at intermediate frequencies, or I and Q equivalents.

Processing is accomplished by reading the stored signal as received from memory 510 to the noninverting input of a subtracting circuit 512, which also receives at an inverting input 596 from a conductor 514 a simulation or reconstruction of the multipath distortion. The multipath-distorted stored signal is corrected by subtraction of the simulated distortion to produce on conductor 513 a partially or completely corrected signal. In the absence of a simulation of the multipath distortion applied to input terminal 596 of subtractor 512, the signal on conductor 513 is simply the stored received signal as read from memory 510.

The simulation of the multipath distortion is generated by a multipath distortion simulator 516. Simulator 516 includes a delay line 518 having an input terminal coupled to conductor 513. A peak limiter illustrated as a dashed block 520 may be interposed between conductor 513 and delay 518 for stabilizing the system. Delay line 518 has a maximum or total delay at least equal to the maximum expected difference between the delay of the main transmission path (20 of FIG. 1) and that of the longest significant multipath (24 of FIG. 1). Delay line 518 is resettable via a "clear" line and is tapped at various points along its length by a plurality of taps separated in time by the minimum desired time resolution of the correction. The plurality of taps is illustrated in FIG. 5 by taps 522a through 522z. Each of taps 522a–522z can be individually enabled or disabled under control of a signal on conductor 524. It is clear that when an undistorted burst is produced on conductor 513, selection or enabling of the appropriate taps from among taps 522a–522z will produce at the output of enabled ones of taps 522a–522z a plurality of mutually delayed components having delays corresponding to the significant multipath distortion components. The outputs of taps 522a–522z are applied to a number of phase shifters ($\Delta\phi$) illustrated as 526a–526z. Each phase shifter 526a–526z is associated with one of taps 522a–522z. Phase shifters 526a–526z are controlled by signals applied over a conductor 528 from a tap weight calculator and control logic circuit illustrated as a block 542. When the signal on conductor 513 is a data burst fully corrected for multipath distortion, and taps 522a–522z are producing delayed samples of the burst which correspond in delay to the multipath components, the proper adjustment of phase shifters 526a–526z can adjust the phase of each simulated multipath component to match the phase of the multipath component which contaminates the signal as received. Each phase shifter 526a–526z has its output coupled to one of a plurality of controllable attenuators illustrated as 530a–530z. Each attenuator 530a–530z is associated with one of phase shifters 526a–526z. The attenuation of attenuators 530a–530z is individually adjustable under the control of signals applied from tap weight calculator and control logic 542 over a conductor 532. The individual simulated multipath signals at the outputs of attenuators 530a–530z are applied to a summing circuit 534 which sums the individual simulated multipath signals to produce a sum simulated multipath signal which is applied by way of conductor 514 to the inverting input terminal of subtracter 512.

In order to be able to select one or more of taps 522a–522z in order to simulate the multipath distortion experienced by the received data bursts in traversing the dispersive transmission path, the multipath distortion delay of each distortion component must be evaluated. This is done by an evaluator 536 which includes an autocorrelator 538 having its input coupled to the output of memory 510 for receiving stored signal therefrom. Autocorrelator 538 produces autocorrelation peaks, the relative delay of which is evaluated by a tap locator 540. Tap locator 540 produces on conductor 524 signals for selecting those taps from among taps 522a–522z which are to be enabled.

FIGS. 6a–6f illustrate the principles involved in autocorrelating to establish the multipath distortion delay. In FIG. 6a, a transmitted packet is illustrated as being received in a interval T0–T4, and one multipath distortion component is received in the interval T2–T6, as illustrated in FIG. 6b. Thus, the combination of the packet received by the main path and by the multipath is received in the interval T0–T6, as illustrated in FIG. 6c. The effects of added noise are illustrated in FIG. 6d. In autocorrelation, the signals are variably delayed and multiplied together. FIG. 6e represents the signal of FIG. 6d delayed by a delay $\tau$. FIG. 6f illustrates an autocorrelation peak at time T0 (representing the autocorrelation of the main burst) and a second, additional, autocorrelation peak at time T2, delayed by $\tau$ relative to time T0. The value of $\tau$ equals the delay of the multipath signal of FIG. 6b relative to the main path signal of FIG. 6a. While only a single multipath component is illustrated in FIG. 6b and a single additional autocorrelation peak in FIG. 6f, autocorrelation will identify more than one multipath component. Tap locator 540 evaluates one or more delays associated with the autocorrelation peaks and applies signals over conductor set 524 to enable those taps from among taps 522a–522z having corresponding delays. It should be understood that the discrete positions of taps 522a–522f along delay line 518 may not exactly match the delays indicated by autocorrelation, but will have been selected to be close enough for satisfactory operation.

Tap locator 540 also produces signals which are applied to tap weight calculator and control logic 542 These signals indicate the relative magnitudes of the autocorrelation peaks produced at the various delays. This information establishes the relative magnitudes of the various multipath distortions and establishes a priority for their processing during iterative optimization.

In general, simply producing one or more delayed signals having delays (relative to the main signal) corresponding to those of the multipath distortion delays, and then subtracting those signals from the original signal, will not result in cancellation of distortion, because the relative phases of the signals to be subtracted from the distortion in order to cancel the signals must be considered. No information is available in the received signal relating to the relative phases of the multipath distortion signals, because the nature of the modulation is unknown. An iterative procedure is used to adjust the phases of the simulated multipath distortion signals, and to select those providing the best cancellation. This iterative optimizing procedure depends upon being able to produce a signal indicative of the relative quality of the corrected signal. A signal quality evaluator 544 provides such a signal. Signal quality evaluator 544 bears similarities to the signal-to-noise evaluator described in U.S. Pat. No. 4,317,206 issued Feb. 23, 1982, to Nossen. Evaluator 544 differs in that it produces a measurement of signal components other than the carrier. Signal quality evaluator 544 includes a frequency multiplier 546 which performs a frequency doubling in the case of reception of binary phase shift keyed (BPSK) and minimum shift keyed (MSK) signals, and which frequency quadruples in the case of receipt of quadrature phase shift keyed (QPSK) signals. The effect of frequency multiplication in the cases of BPSK and QPSK is to eliminate the suppression of the carrier to produce a frequency doubled carrier therefrom, and to eliminate sidebands attributable to the data modulation.

FIG. 7 illustrates vectors 700 and 702 at 0° and 180°, respectively, representing modulation of a BPSK signal. It should be noted that vector 700 occurs at different times then does vector 702, since the modulation alternates in accordance with the logic level of the data. FIG. 7*b* illustrates vectors 700 and 702 after frequency doubling, illustrating a common direction. FIG. 7*c* is an amplitude versus frequency spectrum plot, illustrating the double frequency carrier without sidebands attributable to data modulation. FIG. 7*d* illustrates vector 700 as reference together with a vector 704 which is the resultant of original modulated vector 702 together with a further vector 706 oriented in quadrature to both vectors 700 and 702. Vector 706 represents a multipath distortion component arising due to a dispersive transmission path. As illustrated, the resultant of original transmitted vector 702 and multipath component 706 is vector 704, at a relative angle of 120°. FIG. 7*e* illustrates the result of frequency doubling vectors 700 and 704. As illustrated, vector 705 is at an angle of 320° rather than at 0°. FIG. 7*f* is an amplitude versus frequency spectrum plot illustrating the result of frequency doubling of a BPSK modulated signal in the presence of multipath distortion. Unlike the situation illustrated in FIG. 7*c*, the spectrum of FIG. 7*f* includes a double frequency carrier component 710 and other spectral components designated generally as 712 distributed about double frequency carrier 710. The other spectral components 712 have an amplitude which depends upon the amplitude of the multipath distortion component.

Figure 8:
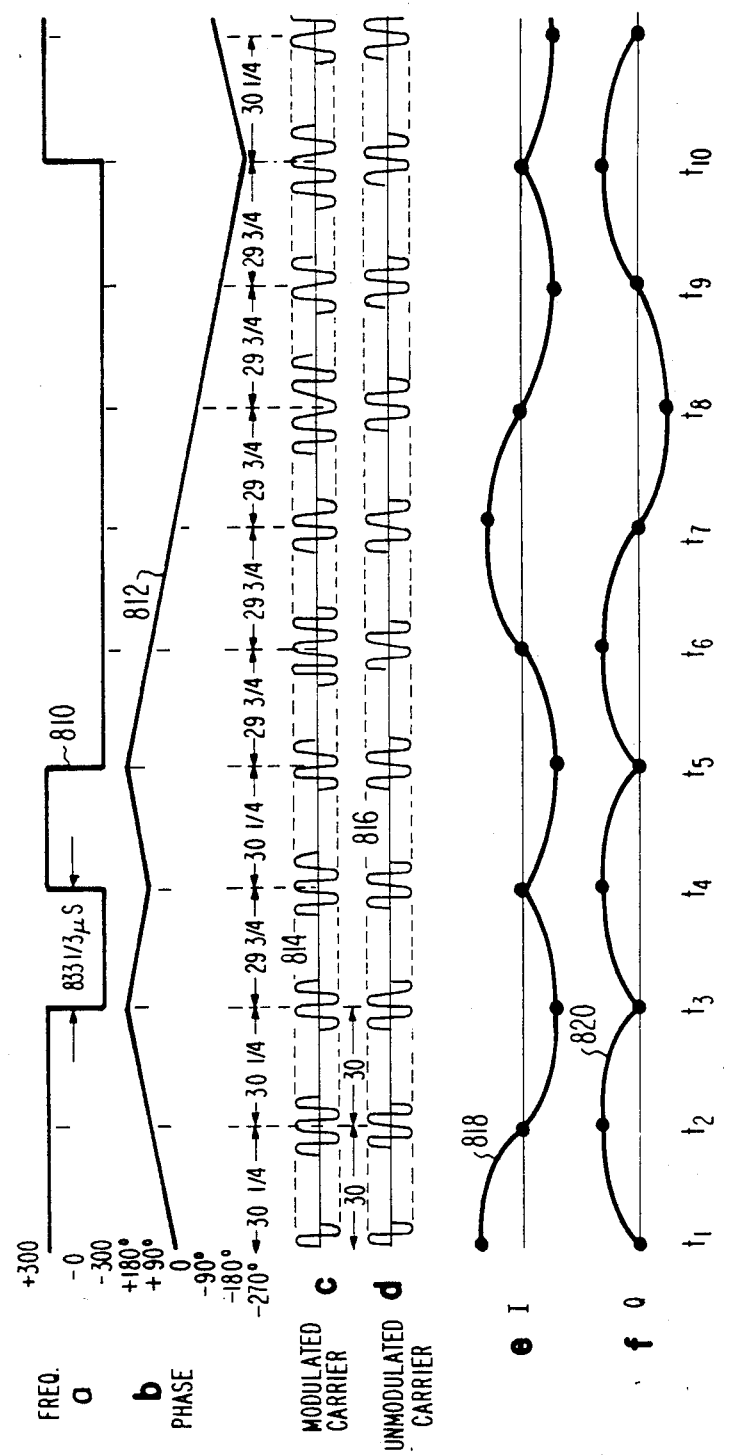
FIGS. 8a–8f illustrate an arbitrary data signal and the MSK modulated carrier resulting therefrom, together with other related information.

The effects of frequency multiplication by frequency multiplier 546 (FIG. 5) on a MSK signal differs somewhat from that illustrated for a BPSK signal. An MSK signal may be viewed as a frequency modulated signal in which the total deviation is one-half the modulation data rate. This is illustrated in FIGS. 8*a*–8*f*, in which FIG. 8*a* illustrates an arbitrarily selected digital information signal 810 which, for example, has a 1200 bit-per-second (BPS) data rate, corresponding to a bit duration of 833⅓ microsecond (μS). As illustrated in FIG. 8*a*, the MARK (logic high) portions have a frequency above the nominal carrier frequency and the SPACE (logic low) portions have a frequency below the nominal carrier frequency. For a data rate of 1200 BPS, the total deviation is 600 Hertz (Hz) or ±300 Hz. Data 810 dwells only at a MARK or at a SPACE, and has no dwell time at the carrier frequency. Consequently, the phase of the frequency modulated carrier relative to the unmodulated carrier is a ramp having a positive slope during MARK intervals and a negative slope during SPACE intervals. For MSK modulation, the slope of phase-representative ramp 812 is 90° per bit interval. For example, in the interval T1–T2 during which the modulated MSK carrier represents a MARK, the phase of the modulated carrier (814 of FIG. 8*c*) relative to unmodulated carrier (816 of FIG. 8*d*) increases from 0° to +90°. As illustrated in FIGS. 8*c* and 8*d*, this means that the modulated carrier 814 is at a frequency such that an even number of cycles plus one-quarter cycle occurs during each bit interval, while the unmodulated carrier 816 is at a frequency which results in only an integer number of cycles during that same interval. As illustrated in FIG. 8*d*, the integer number of cycles is 30, which defines the unmodulated carrier frequency as $$f_c = 30 \text{ cycles}/833.33 \ (10^{-6}) \text{ sec} = 36 \text{ KHz}$$

The phase of modulated carrier 814 continues to increase by a further 90° during time interval T2–T3, resulting in a further interval having 30¼ cycles. As a result, at time T3, the modulated carrier and the unmodulated carrier are mutually out-of-phase. During the interval T3–T4, the information signal 810 defines a SPACE. During SPACE intervals, the slope of characteristic 812 is −90° per bit interval. Consequently, during the interval T3–T4, the phase returns to the same phase which existed at time T2. FIG. 8*e* illustrates as 818 a plot of the multiplicative product of MSK modulated carrier 814 and unmodulated carrier 816, and FIG. 8*f* illustrates as 820 a plot of the multiplicative product of MSK modulated carrier 814 and an unmodulated carrier (not illustrated) in phase quadrature with carrier 816.

Figure 9:
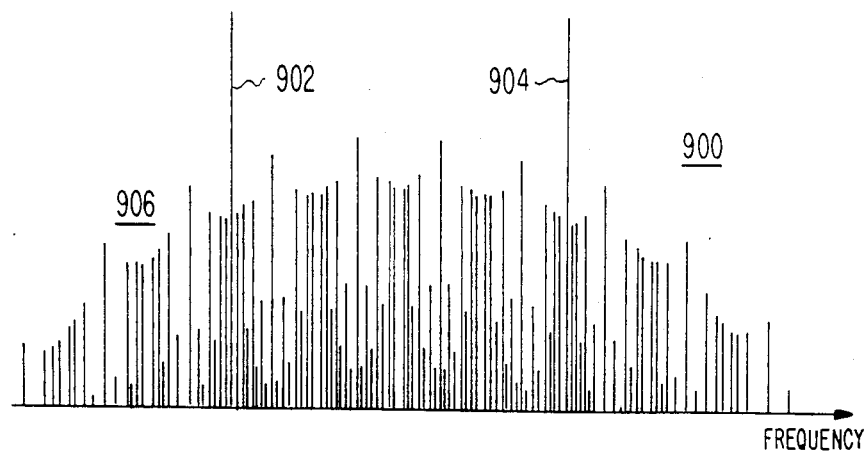
FIG. 9 is an amplitude versus frequency spectrum of the effects of frequency doubling the modulated MSK signal of FIG. 8c.

It will be noted that modulated carrier 814 of FIG. 8*c* represents two distinct carrier frequencies, as selected by the modulation. When modulated carrier 814 is frequency doubled by frequency multiplier 546 (FIG. 5) an amplitude versus frequency spectrum such as spectrum 900 of FIG. 9 is produced. Spectrum 900 includes major spectral lines 902 and 904 which represent frequency doubling of the two distinct carrier frequencies contained in MSK modulated carrier 814. Spectrum 900 also contains a large number of other components designated together as 906. Therefore, unlike the situation for BPSK and QPSK, frequency multiplication of an MSK signal does not eliminate the data.

It has been found that for purposes of iterative control, the best results are achieved when the frequency multiplied carrier components are ignored, and the control is based upon total energy in the sidebands other than the carrier components (such as 712 of FIG. 7*f* or 906 of FIG. 9). In FIG. 5, spectrum analysis block 548 evaluates the total power in the frequency multiplied spectrum produced by frequency multiplier 546 to produce on a conductor 550 a Q signal representative of the quality of the corrected signal on conductor 513. The Q signal is smallest when the signal quality is highest. For BPSK and QPSK, the Q signal may approach zero value for low distortion situations, while for MSK the Q signal will approach a value equivalent to the data-dependent sideband energy.

Tap weight calculator and control circuit 542 iteratively evaluates the quality of the corrected signal for various phase shifts of the simulated multipath distortion signals produced by simulator 516, and selects those values which minimize the quality signal on conductor 550. When the phase shifts have been corrected, stored signal from memory 510 is passed through subtractor 512 to conductor 513. Simulator 516 produces phase-optimized multipath distortions which are applied over conductor 514 to the inverting input of subtractor 512 for subtraction of multipath distortion from the stored signal for producing clean signals on conductor 513. The clean signals are then stored in output buffer 552 and made available on conductor 328 for application to demultiplexer 322 of FIG. 3. Demultiplexer 322 combines the processed burst of data with other similarly processed bursts and applies them over conductor 324 to utilization means (not illustrated).

Figure 10:
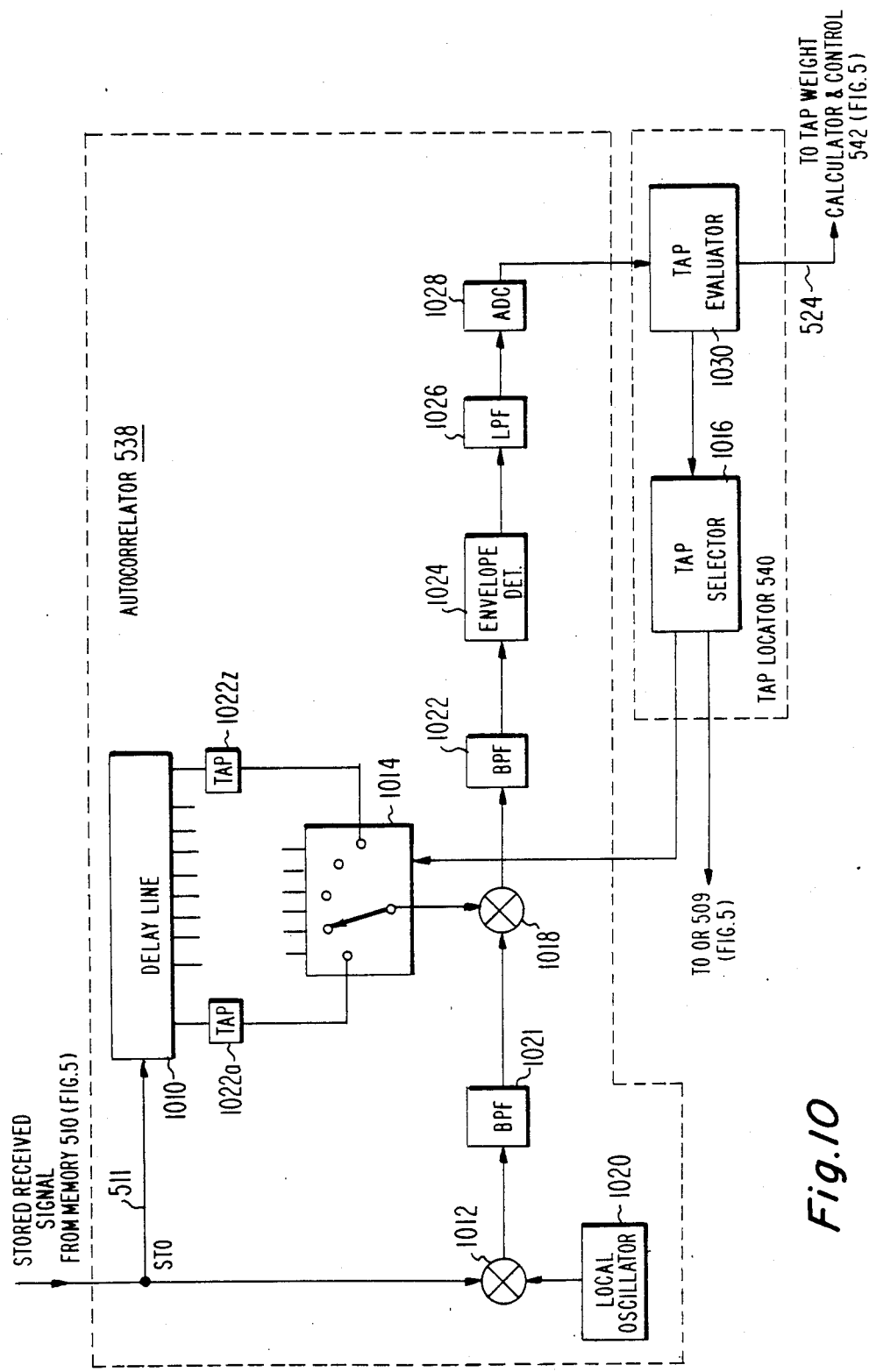
FIG. 10 is a block diagram of an autocorrelator and tap locator useful in the arrangement of FIG. 5.

FIG. 10 is a block diagram of multipath distortion delay evaluator 536 of FIG. 5. In FIG. 10, elements corresponding to those of FIG. 5 are identified by the same reference numerals. In FIG. 10 the stored received signal from memory 510 (FIG. 5) is repeatedly applied to a tapped delay line 1010 and to a mixer 1012. Delay line 1010 has a length equal to that of delay line 518 of FIG. 5, and has an equal number of taps, illustrated as 1022a–1022z. Each tap is enabled in sequence by a single pole, multiple throw switch 1014 under control of a tap selector 1016. Tap sequence selector 1016 thus sequentially selects a position of switch 1014, thereby enabling one tap from among the plurality of taps 1022a–1022z, and then causes memory 510 to be read into delay line 1010. At each reading, the stored received signal is applied to mixer 1012 and a delayed version of the stored received signal is applied from switch 1014 to an input terminal of a mixer 1018. The stored received signal applied to the first mixer is converted to a second IF frequency by means of a local oscillator signal from a local oscillator 1020. A band pass filter (BPF) 1022 selects the appropriate mixing product, which is applied to an input terminal of mixer 1018. This performs the autocorrelation of the direct and delayed stored received signals. At zero delay, which is the first tap location tested or processed, the difference frequency produced at the output of mixer 1018 is equal to the local oscillator frequency. This is filtered by a bandpass filter 1022, envelope detected by a detector 1024, low pass filtered by a low pass filter 1026, and converted to a digital number by an analog to digital converter (ADC) 1028 for application to tap locator 540.

Tap selector 1016 of tap locator 540 steps through all taps 1022a–1022z sequentially. For each tap location, a correlation value from ADC 1028 is determined by autocorrelator 538 and applied to a tap evaluator 1030. The location of the tap producing a significant output from ADC 1028, and the amplitude of the output, are stored in the tap evaluator. It selects those taps which exhibit significant correlation values. The selections are passed on to the tap weight calculator by conductor 524.

FIG. 11 is a block diagram of signal quality evaluator 544 of FIG. 5. In FIG. 11 the stored received signal is applied to both input ports of a mixer 1110 to produce a carrier at twice the center frequency ($2F_1$) for BPSK modulation. Signals of interest are passed by a bandpass filter (BPF) 1112 and the regenerated carrier (or carriers) is rejected by a notch filter 1114. An envelope detector 1116 converts the residual components around frequency $2F_1$ to a baseband voltage. After low pass filtering by a LPF 1118, this is converted by an ADC 1120 to a digital word for use in the tap weight calculator. For MSK, two notch filters are required to remove the two subcarriers.

Figure 12:
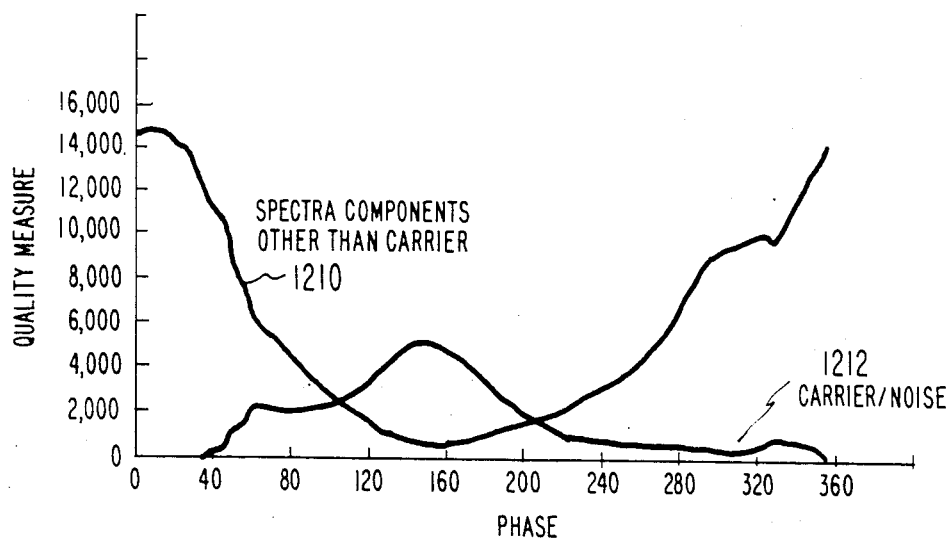
FIG. 12 illustrates the relative amplitudes of two different measures of signal quality.

FIG. 12 is a plot of quality signal Q on conductor 550 as a function of phase of the multipath signal generated by simulator 516 for the case of a multipath component having phase of 158°. In FIG. 12, 1210 is a plot of the spectral components other than the carrier. As illustrated, curve 1210 is smooth and substantially monotonic from 40° to 158° and from 158° to approximately 280°. Also illustrated in FIG. 12 as curve 1212 is the ratio of carrier energy to other spectral energy. As illustrated in the region between phases of 60° to 90° and between phases of 250° to 280°, curve 1212 is substantially flat. Thus, curve 1212 provides less information in those regions for optimizing the phase than does curve 1210. Furthermore, the slope of curve 1210 is generally greater at any point than the slope of curve 1212, thereby indicating a greater sensitivity of the quality measurement to incremental changes in the phase of the simulated multipath distortion signal. Such greater sensitivity to incremental changes provides faster optimization than does a lesser sensitivity.

Figure 13D:
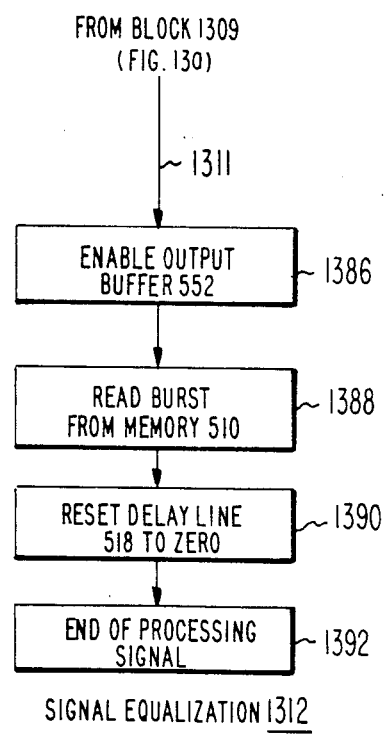
Figure 13A:
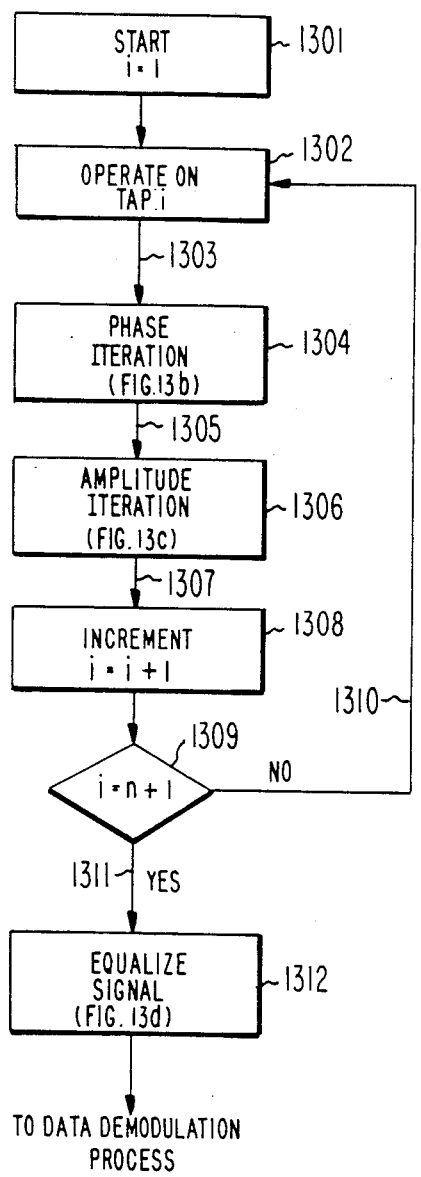
Figure 13B:
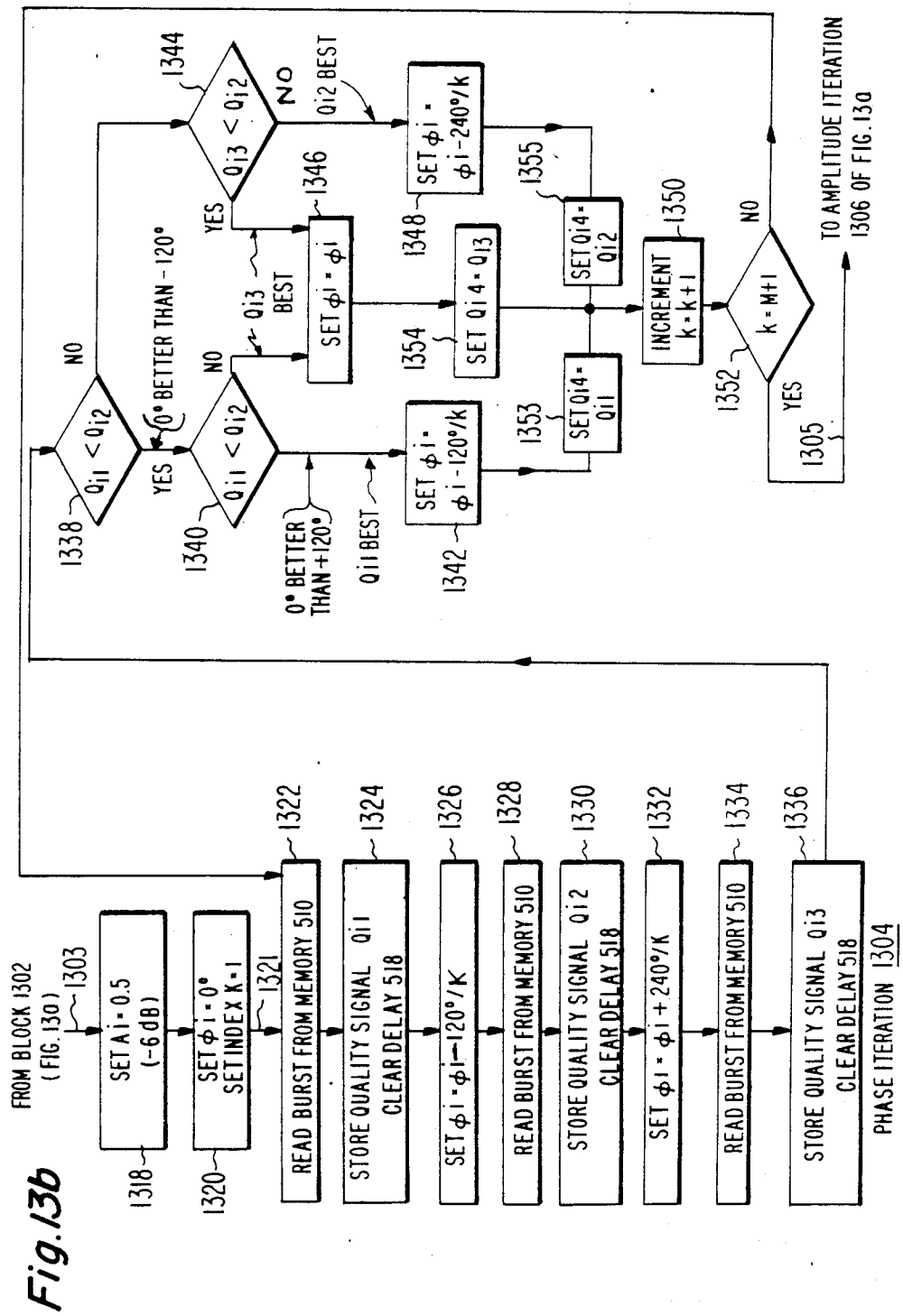
Figure 13C:
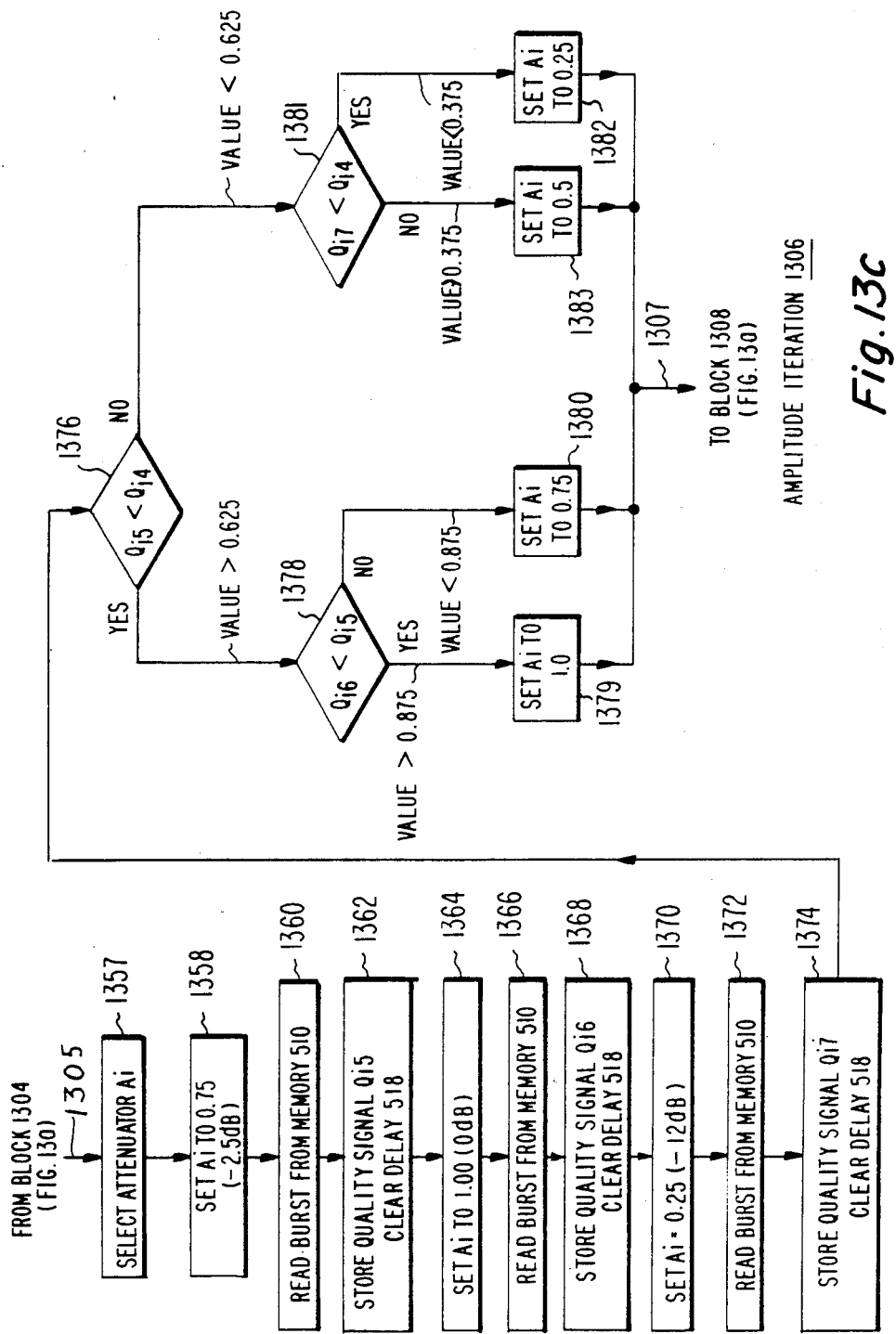

FIG. 13a is an overall flowchart illustrating the operation of processor 32a of FIG. 5 during processing of one burst of signal under control of tap weight calculator and control logic 42. FIG. 13a illustrates the overall logic, while FIG. 13b is directed to that part of the logic which is for optimizing the phase settings of those phase shifters ($\Delta\phi$) 526a–526z receiving signals from taps 522a–522z which are enabled by tap locator 540. FIG. 13c illustrates the logic for optimization of attenuators 530a–530z. FIG. 13d illustrates an executive logic for performing the equalization after the optimization of phase shifters and attenuators. In FIG. 13a, a starting point block 1301 represents initiation following receipt by the receiver or processor of a burst. At the starting time, memory 510 (FIG. 5) is completely loaded with a data burst and its distortion components, as described above. The information in memory 510 is read in logic block 1301, which allows autocorrelator 538 to produce autocorrelation peaks which tap locator 540 evaluates to produce information as to which of taps 522a–522z are to produce significant outputs in order to simulate significant multipath distortion components. Those taps which are significant are designated $T_i$, and the number of such taps which will be enabled is defined by index i, which ranges from 1 to n.

Block 1302 represents the selection of one of the significant taps for optimization, as established by selection of an index i. This selection is preferably in the order of the significance (the magnitude) of the multipath distortion components which the output of the tap represents. Thereupon, the logic flows by a path 1303 to a block 1304, which represents iterative optimization of the phase shift of the selected tap. When the phase shift of the selected tap has been optimized, the attenuation of the associated attenuator is iteratively optimized, as represented by block 1306. This completes the regeneration of the $i^{th}$ distortion component. Index i is incremented in block 1308, and the incremented index is compared with n+1 in a decision block 1309. If the index i has not reached n+1, the NO output of block 1309 causes the logic to flow back to block 1302 by path 1310, thereby selecting the next phase shifter and attenuator for optimization. If index i has reached n+1, phase shifters and attenuators associated with all taps producing significant distortion components have been optimized, and the YES output of decision block 1309 directs the logic by path 1311 to block 1312. Block 1312 represents equalization of the stored signal by subtraction therefrom of the n distortion components having optimized phase shift and attenuation.

FIG. 13b is a flowchart illustrating details of the logic of phase iteration block 1304 of FIG. 13a. In FIG. 13b, phase iteration begins with a block 1318 which represents the setting of the attenuator associated with the phase shifter which is to be optimized. This attenuator is $A_i$, and it is set to a value of 0.5, corresponding to an attenuation of 6 dB. The logic flows to block 1320, which sets the value of phase shift ($\phi_i$) of the phase shifter to 0°, and sets a running index K to a value of 1. Index K controls the number of iterations of the phase optimization of the $i^{th}$ phase shifter, and consequently establishes the accuracy with which the regenerated multipath distortion component phase corresponds to the phase of the actual multipath distortion component. As described below, the phase shifter is set in sequence to 0°, −120° and to +120° on the first iteration (K=1), and on the second iteration is sequentially set to one of three positions which are 60° apart, and on the third iteration to one of three positions which are 30° apart. In general, if the phase of the regenerated multipath distortion component is within 10° to 15° of the actual phase of the distortion component, there will be little residual error in the cancellation process when the regenerated distortion component is subtracted from the stored signal. Consequently, only four iterations are required in the arrangement of FIG. 13b to reach the desired accuracy. Naturally, different logic arrangements and performance standards will require a greater or fewer number of iterations.

With the phase shifter set to 0°, the logic flows to block 1322 which represents the reading of memory 510 of FIG. 5, which causes signal to be applied through subtractor 512 (FIG. 5) to conductor 513 and to delay line 518, through taps 522, phase shifters 526 and attenuators 530 to summer 534 to produce a first simulated multipath signal on conductor 514 for subtraction from the stored signal. During this process, signal quality evaluator 544 produces a quality signal $Q_i$ on conductor 550. The quality signal is stored in memory internal to logic 532 as $Q_{i1}$ in logic block 1324, and delay line 518 is cleared. If delay 518 were not cleared it might contain undesirable components at the beginning of the next iteration, which would contaminate with distortion the undistorted first portion of the received signal as represented by the signal stored in memory 510. In block 1326, phase shifter $\Delta\phi_i$ has its phase shift $\phi_i$ changed from its previous value (which was 0°) to $\phi_i - 120°/K$. Thus, the new current value of phase shift $\phi_i$ is set in block 1326 to 0°−120° during the first iteration (for which K=1). With the current value of $\phi_i$ equal to −120°, the logic flows to block 1328, which represents the reading of a burst of signal from memory 510, which again produces a simulated multipath signal which is subtracted for the stored signal, and results in a new quality signal. The new quality signal is stored in memory internal to logic 542 and is identified as $Q_{i2}$, as indicated in logic block 1330. Delay line 518 is cleared. The logic continues to block 1332, which resets the current value of phase shift of the $i^{th}$ phase shifter from the previous value of −120° to a new value of −120°+240°/K. For the first iteration, K=1, and therefore block 1332 represents the setting of the current value of phase shift $\phi_i$ to −120°+240°, which corresponds to +120°. With $\phi_i$ set to +120°, the logic flows to block 1334 which represents yet another reading of stored burst signal from memory 510 to produce another quality signal which is stored in internal memory as $Q_{i3}$, as represented by block 1336. Delay 518 is again cleared.

The operation of the system in logic blocks 1322−1336 of FIG. 13b, as so far described, has resulted in storage in internal memory of a quality signal associated with three settings of the $i^{th}$ phase shifter, corresponding to 0°, −120° and +120°. The logic flows to a decision block 1338 which compares the magnitudes of the stored quality signals $Q_{i1}$ and $Q_{i2}$, representing the 0° and −120° values for phase shifter i=1. If $Q_{i1}$ has a lesser magnitude than $Q_{i2}$, the logic proceeds by the YES path to a further decision block 1340. It should be remembered that quality is greatest when the quality signal is least, so that the YES output of decision block 1338 indicates that as between quality signals $Q_{i1}$ and $Q_{i2}$, $Q_{i1}$ represents the higher quality signal and therefore 0° is a better approximation than −120° to the actual phase of the distortion component. When decision block 1340 is reached by way of the YES output of block 1338, it has been established that $Q_{i1}$ represents a higher quality signal than $Q_{i2}$ but the quality of $Q_{i1}$ relative to $Q_{i3}$ is not known. Decision block 1340 compares the magnitude of $Q_{i1}$ with that of $Q_{i3}$, and if $Q_{i1}$ is less than $Q_{i3}$, indicating that $Q_{i1}$ represents a higher quality signal, the YES output of block 1340 directs the logic to block 1342, in which the current value of $\phi_i$ is updated to the previous value of $\phi_i$ (which was +120°) −120°/K. For the first iteration, K equals one, and therefore the current value of $\phi_i$ is updated to 0°, which is the best approximation of the phase of the multipath distortion component among the three phases tested. The NO output of block 1340, on the other hand, indicates that $Q_{i3}$ is less than $Q_{i1}$, which in turn is less than $Q_{i2}$, and therefore $Q_{i3}$ represents the highest quality signal. The NO output of block 1340 directs the logic to a block 1346, in which the current value of $\phi_i$ is updated to the previous value of $\phi_i$. Since the current value of $\phi_i$ just before reaching block 1346 is +120°, as set in block 1332, the update sets the new value of $\phi_i$ to +120°. This means that the +120° approximation of the phase of the multipath distortion component was the best of the three.

If, in decision block 1338, it had been found that quality signal $Q_{i2}$ was smaller than $Q_{i1}$, the NO output of decision block 1338 directs the logic to a further decision block 1344, in which $Q_{i2}$ is compared with $Q_{i3}$. If $Q_{i3}$ is less than $Q_{i2}$, the YES output of decision block 1344 directs the logic to block 1346. On the other hand, if $Q_{i3}$ is greater than $Q_{i2}$, then clearl $Q_{i2}$ has the lowest magnitude among the three quality signals, and therefore represents the highest quality signal. Since $Q_{i2}$ resulted from a phase shifter setting of −120°, the NO output of decision block 1334 directs the logic to a block 1348. Block 1348 updates the current value of $\phi_i$ by subtracting from the previous value (+120° as set in block 1332) the value 240°/K. The new value of $\phi_i$ as established by logic block 1348 is therefore −120°. Whatever the updated value of $\phi_i$ may be as established by blocks 1342, 1346, or 1348, the logic flows by way of one of blocks 1353, 1354 or 1355, respectively, to a further block 1350 which represents the incrementing of index K. A decision block 1352 compares the incremented value of K with the value M+1, where M represents the desired number of iterations. If K<(M+1), the logic flows by the NO output of decision block 1352 back to block 1322 to begin a second iteration. If index K=(M+1), the YES output of decision block 1352 directs the logic along path 1305 to amplitude iteration block 1306 (FIG. 13a).

The second iteration of the arrangement of FIG. 13b starts with $\phi_i$ set to 0°, −120° or +120°, depending upon which was found to provide the highest quality signal. Assuming that the first iteration ended with $\phi_i$ set to −120°, a new quality sign $Q_{i1}$ is established for −120° in blocks 1322 and 1324, block 1326 resets $\phi_i$ to −180°, and a new value of $Q_{i2}$ is set in block 1330.

Block 1332 resets $\phi_i$ to $-60°$, and a new value of $Q_{i3}$ is established in block 1336. The three new values for $Q_{i1}$, $Q_{i2}$, and $Q_{i3}$ thus represent the signal quality for $-120°\pm 60°$. The decision matrix extending from decision block 1338 to block 1348 operates on these three signals, and the current value of $\phi_i$ is updated to that one of $-60°$, $-120°$, $-180°$ which provides the highest quality signal, and the third iteration begins with the new value of $\phi_i$. During the third iteration, block 1326 decrements the angle selected during the second iteration by 40°, and block 1332 increments the then current value by 80°. This procedure continues until the desired phase accuracy is achieved.

So far not described in conjunction with FIG. 13b are the functions of blocks 1353, 1354 and 1355. After each iteration through the decision logic of FIG. 13b, the value of a quality signal designated $Q_{i4}$ is updated to equal that one of $Q_{i1}$, $Q_{i2}$ or $Q_{i3}$ which is associated with the best approximation to the phase of the multipath distortion component. Since all the optimizations of the phase as described in conjunction with FIG. 13b are performed with an attenuator setting of 0.5, the value of $Q_{i4}$ when phase optimization of the phase shifter is complete represents a quality signal which is useful for amplitude optimization. Thus, the value of $Q_{i4}$ represents the best current value of quality signal for an attenuator setting of 0.5, and is used in conjunction with the attenuator optimization, described below in conjunction with FIG. 13c.

As an example of the optimization of a phase shifter by the described method, assume that the actual phase shift of a multipath distortion component is $-138°$. For the first iteration, K=1. The phase shifter setting $\phi_i$ is set to a current value of 0° (block 1320), and the resulting quality signal $Q_{i1}$ is stored (block 1324). The current value of the phase shifter setting is changed (block 1326) by subtracting $120°/K = 120°$ to produce a new current value of $\phi_i$:

$$\phi_i = 0° - 120° = -120°$$

With this value of $\phi_i$, a quality signal is stored as $\phi_{i2}$ (block 1330), and the value of $\phi_i$ is changed (block 1332) by adding to the current value of $-120°$ the amount $240°/K = 240°$;

$$\phi_i = -120° + 240° = +120°$$

and a third quality signal $Q_{i3}$ is stored (block 1336). The actual phase of the multipath distortion component is $-138°$, so the quality signal for the setting of $\phi_i = -120°$ will be the lowest. This quality signal is $Q_{i2}$. When $Q_{i2}$ is lowest, the value of $\phi_i$ is reset (block 1348) by subtracting $-240°/K$ from the current value of $\phi_i$ (which is $+120°$) to produce a new current value of $\phi_i$, $$\phi_i = +120 - 240 = -120°,$$

which causes the second iteration through the logic of FIG. 13b to start with the phase shifter set to $-120°$.

In the example, during the second iteration (K=2), quality signal $Q_{i1}$ is updated (block 1324) with the value of the quality signal at a phase shifter setting ($\phi_i$) of $-120°$. The value of $\phi_i$ is changed (block 1326) by subtracting from $-120$ the value $120°/K$;

$$\phi_i = -120° - 120°/K$$

$$\phi_i = -120° - 120°/2$$

$$\phi_i = -180°$$

and the value of quality signal $Q_{i2}$ is updated (block 1330) with the current value of $\phi_i$ set to $-180°$. During the next step of the second iteration, the setting of the phase shifter is established by the value of $\phi_i$ as updated in block 1332;

$$\phi_i = -180° + 240°/K$$

$$\phi_i = -180° + 120°$$

$$\phi_i = -60°$$

and quality signal $Q_{i3}$ is generated and stored (block 1336). Thus, during the second iteration, the new quality signals were established for phase shifter settings of $-120°\pm 60°$. When these three quality signals are evaluated by decision blocks 1338–1344 of FIG. 13, it will be found that $Q_{i1}$ will be lowest (representing the highest quality signal), because the actual value of phase shift ($-138°$) of the multipath distortion component which is being evaluated in the example is closer to $-120°$ than to either $-60°$ or to $-180°$. As a result, $\phi_i$ will be set (in block 1342) to $$\phi_i = \phi_i - 120°/K$$

$$\phi_i = -60° - 120°/2$$

$$\phi_i = -60° - 60°$$

$$\phi_i = -120°$$

The third iteration (K=3) will then be performed, evaluating quality signals $Q_{i1}$, $Q_{i2}$, and $Q_{i3}$ at phase shifts of $\phi_i = -120°$, at $\phi_i = -120° - 120°/3 = -160°$, and at $\phi_i = -160° + 240°/3 = -80°$. After the three quality signals are evaluated, it will be found in decision blocks 1338–1344 that $Q_{i1}$ will again be lowest, because $-138°$ is closer to $-120°$ than to either $-160°$ or to $-80°$. The current value of $\phi_i$ is then reset (block 1342 of FIG. 13b) to $\phi_i = -80 - 120°/3 = -120°$, and the fourth iteration (K=4) begins.

The fourth iteration again evaluates quality signals $Q_{i1}$, $Q_{i2}$, and $Q_{i3}$, this time at phase shifter settings of $\phi_i = -120°$, at $\phi_i = -120° - 120°/4 = -150°$, and at $\phi_i = -150° + 240°/4 = -90°$, respectively. Since $-138°$ is closer to $-150°$ than to either $-120°$ or to $-90°$, quality signal $Q_{i2}$ will be lowest, and the phase shifter setting will be changed in block 1348 from the last current value of $-90°$ to $\phi_i = -90° - 240°/4 = -150°$, the closest value found in four iterations. The value of $-150°$ is within 12° of the actual value, $-138°$. This is acceptably close. The value of $Q_{i4}$ (the quality measure for the optimized phase shifter) is set equal to the $Q_{i2}$ in block 1355 for later use during the attenuator optimization.

FIG. 13c is a flow chart illustrating details of amplitude iteration block 1306 of FIG. 13a. When the i$^{th}$ phase shifter has been optimized as described in conjunction with FIG. 13b, the logic flows to block 1357 of FIG. 13c where the associated i$^{th}$ attenuator $A_i$ is selected for operation. Block 1358 sets $A_i$ to a value of 0.75 (corresponding to $-2.5$ dB). Block 1360 represents a reading of burst from memory 510, and consequent generation of a quality signal. Block 1362 represents the storing of a quality signal $Q_{i5}$ and the clearing of delay line 518. The logic then flows to a block 1364 which sets attenuator $A_i$ to a value of 1.0, corresponding to 0 dB. Block 1366 represents the reading of burst from memory 510, and block 1368 the storing of a further quality signal $Q_{i6}$ and clearing of delay 518. Block 1370 sets the attenuator value of 0.25 (−12 dB), block 1372 represents the reading of a burst from memory 510, and block 1374 the storing of a quality signal $Q_{i7}$. At the completion of the logic associated with block 1374, quality signals $Q_{i5}$, $Q_{i6}$, and $Q_{i7}$ have been stored, representing the quality of the signal corrected by subtraction of a regenerated multipath distortion component having the correct phase shift and attenuation values of 0.75, 1.0, and 0.25, respectively. Also, a quality signal $Q_{i4}$ is stored in memory from one of blocks 1353, 1354, and 1355 of FIG. 13b, which represents the quality of the signal with an attenuator setting of 0.5 (from block 1318 of FIG. 13b). With this information, it is possible to select the best of the attenuator settings. The logic flows from block 1374 (FIG. 13c) to a decision block 1376, in which quality signal $Q_{i5}$ (representing the quality for an attenuator setting of 0.75) is compared with $Q_{i4}$. If this indicates that decreasing the attenuation (the change of attenuator setting from 0.5 to 0.75) of the signal derived from the tap has improved the quality, and the quality signal for an attenuation of 0 dB should be evaluated. The logic flows from the YES output of block 1376 to decision block 1378. The YES output of decision block 1378, in which quality signals $Q_{i5}$ and $Q_{i6}$ are compared, establishes whether an attenuator setting of 1.00 or 0.75 best approximates the attenuation of the actual multipath distortion component. If $Q_{i6} < Q_{i5}$, the YES output of decision block 1378 directs the logic to a block 1379 in which the attenuator is set to a value of 1.00. If $Q_{i5} > Q_{i6}$, the NO output of decision block 1378 is selected, which establishes that quality signal $Q_{i5}$ is least in magnitude among $Q_{i4}$, $Q_{i5}$, and $Q_{i6}$. Since the quality signal is substantially monotonic, as illustrated by 1210 of FIG. 12, this establishes that $Q_{i5}$ represents the best quality signal, and therefore the setting of attenuator $A_i$ of 0.75 is the value of attenuation providing the highest quality signal. The NO output of decision block 1378 directs the logic to block 1380, which represents the setting of attenuator $A_i$ to 0.75.

As mentioned, decision block 1376 compares the value of quality signal $Q_{i5}$ (representing the signal quality with attenuator $A_i$ set to 0.75) with quality signal $Q_{i4}$ (representing the signal quality with attenuator $A_i$ set to 0.5). The NO output of decision block 1376 suggests that going from an attenuation setting of 0.5 to a value of 0.75 was the wrong way to go, and the logic flows by the NO output of block 1376 to a further decision block 1381 in which quality signal $Q_{i7}$ is compared with $Q_{i4}$ and, if $Q_{i7} < Q_{i4}$, directs the logic by the YES output to a block 1382, which represents the setting of attenuator $A_i$ to 0.25. On the other hand, if $Q_{i4}$ is greater than $Q_{i7}$, the NO output of decision block 1381 directs the logic to a block 1383 which represents the setting of $A_i$ to a value of 0.5. No evaluation is made for an attenuator setting of 0 (infinite dB), because such a setting represents an insignificantly small multipath distortion component. From blocks 1379, 1380, 1383, and 1382 the logic flows by path 1307 to block 1308 (FIG. 13a).

Block 1308 of FIG. 13a increments index i after the optimization of a phase shifter and its associated attenuator is complete, and the logic flows to a block 1309, as mentioned, which compares index i with the total number of phase shifters and taps to be optimized (which corresponds with the number of significant multipath distortion components). If all of the phase shifters and attenuators have not been optimized, the optimization continues by selection of the NO output of decision block 1309, and returns to block 1302 by path 1310 for selection of another tap, phase shifter and attenuator. When all of the phase shifters and attenuators have been optimized, the YES output of decision block 1309 directs the logic by a path 1311 to a block 1312, which is illustrated in more detail in FIG. 13d.

As mentioned, FIG. 13d represents execution of multipath distortion correction for one frame or burst of received signal, by subtraction of an optimal regenerated multipath distortion signal from the representation of the received signal stored in memory 510. In FIG. 13d, the logic flows by path 1311 to a block 1386 which represents the enabling of output buffer 552 (FIG. 5) for reading. Block 1388 causes a burst to be read from memory 510 with all of the optimized settings of the phase shifters and attenuators, and the resulting substantially distortion corrected signals are thereupon stored in buffer 552. Block 1390 represents resetting of delay line 518 to an all-zero condition, and block 1392 represents the end of signal processing of a burst of signal, and generation of a signal indicative that processing is complete.

When signal processing of a burst is complete, the signal produced by block 1392 is coupled from logic 542 of processor 320a (FIG. 5) over conductor 598 to multiplex control circuit 318 of FIG. 3. Multiplex control 318 then schedules the reading of output buffer 552 in sequence with the output buffers of other processors, such as 320b and 320c, to produce sequential multipath distortion corrected signal on conductor 324.

Figure 14:
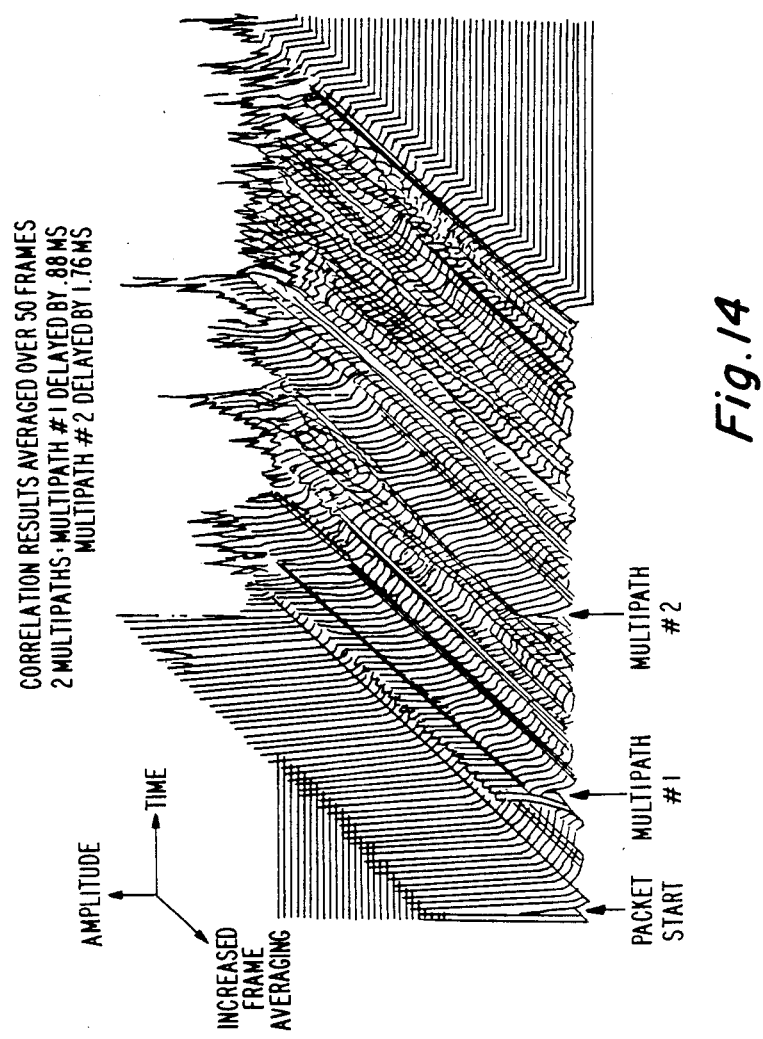
FIG. 14 illustrates a computer plot representing a three-dimensional amplitude versus time plot, with increasing frame averaging as a third dimension, of the results of correlation.

FIG. 14 represents the improvement in identification of tap locations achievable by averaging over a number of transmission bursts. When frequency hopping, each burst on a particular frequency may contain only a small number of bits. The autocorrelation process will clearly show the start of the frame or burst. Autocorrelation over a small number of bits may produce time sidelobes, which may be interpreted as delayed multipath components. As long as the transmitted data appears to be a random bit stream, the time sidelobes will move in time from burst to burst. Averaging over a number of frames will enhance the true multipath correlation peaks while reducing the spurious peaks. The multipath correlation peaks are enhanced by correlating over the entire signal plus multipath duration period. Thus the maximum duration of interest is equal to twice the signal burst duration. Once the multipath location has been clearly defined it is not necessary to process input signals beyond the frame period. During message reception the alternate frame acquisition procedure is not used and every frame is processed for proper phase and amplitude weighting. When a new transmission link or path is established the medium delay characteristics may be learned again by means of the acquisition procedure. FIG. 14 illustrates the reduction of spurious peaks as the frames are averaged from the top to the bottom of the diagram.

Other embodiments of the invention will be obvious to those skilled in the art. For example, those functions illustrated as being performed by hardware may be performed instead by software, and vice-versa. While the invention has been described in the context of frequency hopping burst communications, the invention may be used in conjunction with continuous transmission systems, so long as the signal is broken into discrete frames which may be treated in a manner analogous to bursts. While the signal representative of quality, as described, represents highest quality by the least value, it can readily be generated and processed in inverted form so as to directly represent quality. Instead of three phase settings (0°, 120°, 240°), more or fewer settings may be used (which may result in a fewer or greater number of iterations, respectively). The tap locator (540 of FIG. 5) may operate to set the attenuation of attenuators 530a–530z rather than operating directly on taps 5221–522a, thereby enabling individual taps by allowing signal to pass through its associated attenuator. Similarly, any number of attenuator settings may be used.

What is claimed is:

1. A method for transmitting suppressed-carrier burst communications over a transmission path subject to multipath distortion, comprising the steps of:
   transmitting a burst of suppressed-carrier modulated signal having a predetermined duration at an input end of said transmission path;
   at an output end of said transmission path, storing said burst including an undistorted portion of said burst and a distorted portion of said burst which is affected by multipath reflections to form stored burst;
   at said output end of said transmission path, autocorrelating said stored burst to form autocorrelation peaks, and noting the multipath delay between the largest autocorrelation peak and another correlation peak;
   at said output end of said transmission path, generating a delayed signal representing said burst delayed by said multipath delay;
   at said output end of said transmission path, phase-shifting said delayed signal by a plurality of different phase shifts to generate a plurality of phase-shifted delayed signals, each of which is phase-shifted in a different amount;
   at said output end of said transmission path, frequency-multiplying said stored burst to produce frequency multiplied carrier and other signal components;
   at said output end of said transmission path, selecting that one phase-shifted delayed signal from among said plurality of phase-shifted delayed signals which, when subtracted from said stored burst, produces the smallest absolute magnitude of said other signal components; and
   subtracting from said stored burst at least said one phase-shifted delayed signal.

2. A method according to claim 1 further comprising the steps of:
   at said output end of said transmission path, attenuating said one phase-shifted delayed signal by a plurality of different attenuations to generate a plurality of attenuated phase-shifted delayed signals, each of which is attenuated in a different amount;
   at said output end of said transmission path, selecting that one attenuated phase-shifted delayed signal from among said plurality of attenuated phase-shifted delayed signals which, when subtracted from said stored burst, produces the smallest magnitude of said other signal components; and
   using said one attenuated phase-shifted delayed signal in said subtracting step.

3. A method according to claim 1 wherein said transmitting step comprises transmitting an MSK-modulated signal, and said frequency-multiplying step comprises a frequency-doubling step.

4. A method according to claim 1 wherein said storing step comprises the step of:
   storing for said predetermined duration; and
   storing for a period in excess of said predetermined duration.

5. An equalizer for multipath distortion in a suppressed carrier burst communication system, comprising:
   memory means for storing each received signal burst to form stored signal burst, each said stored signal burst including an undistorted first portion and a distorted second portion affected by multipath distortion;
   autocorrelation means coupled to said memory means for autocorrelating said stored signal burst for generating correlation peaks;
   multipath delay identifying means coupled to said autocorrelation means for establishing a multipath delay between the largest autocorrelation peak and at least one other autocorrelation peak;
   tapped delay means coupled to said memory means for receiving stored signal burst therefrom and for propagating said stored signal burst to a plurality of taps to form tapped delayed signals;
   enabling means for enabling at least one tap from among said plurality of taps for producing a selected tapped signal having a delay relative to said signal burst which is nearest said multipath delay of all said tapped delayed signals;
   phase shifting means coupled to said at least one tap for producing a plurality of mutually phase-shifted signals from said selected tapped signal;
   subtracting means for separately subtracting at least some of said plurality of mutually phase-shifted tapped signals from said stored signal burst to produce subtracted signals;
   frequency multiplying means coupled to said subtracting means for multiplying the frequency of said subtracted signals to form frequency multiplied subtracted signals including carrier component and other signal component;
   phase identifying means coupled to said subtracting means and to said frequency multiplying means for identifying that one mutually phase-shifted signal from among said plurality of mutually phase-shifted signals which when subtracted from said stored signal burst produces the lowest absolute magnitude of said other signal component; and
   coupling means coupled to said phase identifying means, to said phase-shifting means and adapted to be coupled to utilization means for coupling to said utilization means a multipath corrected signal representing said stored signal burst from which at least said one mutually phase-shifted signal has been subtracted.

6. An equalizer according to claim 5 further comprising:
   attenuating means coupled to said phase shifting means for producing a plurality of attenuated signals representing said one mutually phase-shifted signal having different relative magnitudes;
   amplitude identifying means coupled to said attenuating means and to said frequency multiplying means for identifying that one of said attenuated signals from among said plurality of attenuated signals which when subtracted from said received signal produces the lowest absolute magnitude of said other signal component; and means for attenuating said one mutually phase-shifted signal by the amount of attenuation of said one of said attenuated signals.

7. An equalizer according to claim 5 further comprising:

means for clearing said tapped delay means at the beginning of reception of each of said received signal bursts.

8. A method for communicating over a transmission path by means of suppressed-carrier bursts, comprising the steps of:

transmitting a burst of suppressed-carrier signal having a predetermined duration;

receiving and storing suppressed-carrier signal and those signals received during a predetermined duration after receipt of said burst of signal to form stored suppressed-carrier signal;

autocorrelating said stored suppressed-carrier signal to produce autocorrelation peaks;

determining the duration between the largest autocorrelation peak and at least one lesser correlation peak to establish multipath delay;

generating a multipath representative signal representative of said received suppressed-carrier signal delayed by said multipath delay;

phase shifting said multipath representative signal to produce a plurality of relatively phase-shifted multipath representative signals;

subtracting each of said plurality of relatively phase-shifted multipath representative signals from said stored signals to form a plurality of corrected signals;

frequency-multiplying each of said corrected signals to produce a plurality of frequency-multiplied signals, each including carrier and other components;

selecting from among said plurality of relatively phase-shifted multipath representative signals that one which produces the smallest absolute magnitude of said other components to produce a selected phase shifted multipath representative signal; and applying to utilization means said stored suppressed carrier signal from which a correction signal having the delay and phase characteristics of said selected one of said relatively phase-shifted multipath representative signals has been subtracted.

9. A method according to claim 8 further comprising the steps of:

generating a plurality of relatively attenuated versions of said selected phase shifted multipath representative signals;

selecting from among said plurality of relative attenuated versions of said selected phase shifted multipath representative signals that one which produces the smallest absolute magnitude of said other components; and attenuating said correction signal by an amount equal to that by which said selected one of said relatively phase-shifted multipath representative signal has been attenuated.

10. A method according to claim 8, further comprising the step of:

determining the duration between said largest autocorrelation peak and an autocorrelation peak other than said lesser correlation peak to establish a second multipath delay;

repeating said generating, phase-shifting, subtracting, frequency multiplying, and selecting steps; and further subtracting from said suppressed carrier signal supplied to said utilization means the relatively phase-shifted multipath representative signal established by said repeating step.

11. A method according to claim 8 further comprising the step of peak-clipping said corrected signals.

12. An equalizer for suppressed-carrier burst signals received over a dispersive transmission path, comprising:

memory means for storing the suppressed-carrier signals received during said burst and during a predetermined time following receipt of said burst to form stored signals, whereby said stored signals include uncontaminated signal and signal contaminated by multipath distortion;

autocorrelation means coupled to said memory means for autocorrelating said stored signals for producing autocorrelation peaks;

multipath delay determining means coupled to said autocorrelation means for determining the delay between the signal components represented by the largest autocorrelation peak and at least one lesser autocorrelation peak to produce at least one multipath delay signal;

subtraction means coupled to said memory means for receiving said stored signals and for subtracting from said stored signals those signals applied to an inverting input terminal to produce a subtracted signal;

delay means having a delay at least equal to said duration of said burst and including a plurality of taps having various delays;

first coupling means coupled to said subtraction means and to said delay means for coupling said subtracted signal from said subtraction means to said delay means;

tap selection means coupled to said multipath delay determining means and to said delay means for enabling at least one of said plurality of taps having a delay similar to that represented by said multipath delay signal for producing at least one delayed signal;

controllable phase-shifting means for phase-shifting signals applied thereto;

summing means;

second coupling means coupled to said plurality of taps, to said phase-shifting means, and to said summing means for applying at least said one delayed signal to said phase-shifting means for phase-shifting said delayed signal for generating phase-shifted delayed signals, and for summing together said phase-shifted delayed signals to form a regenerated multipath signal at an output terminal of said summing means;

third coupling means coupled to said second coupling means and to said subtraction means for applying said regenerated multipath signal to said inverting input terminal of said subtraction means, whereby said subtracted signal is a multipath distortion corrected signal;

frequency doubling means coupled to said first coupling means for receiving said multipath distortion corrected signal and for frequency multiplying said multipath distortion corrected signal to produce a frequency multiplied signal including carrier components and other components;

phase iteration control means coupled to said memory means and to said controllable phase shifting means for recurrently reading said memory means for recurrently generating said stored signals and for controlling the phase of said controllable phase-shifting means for selecting that value of phase shift for which said other components have the least absolute magnitude; and output coupling means coupled to said second coupling means and to said phase iteration control means, and adapted for coupling to utilization means for reading said stored signal from said memory to said subtraction means, thereby subtracting from said stored signal a multipath error signal derived from those taps selected by said tap selection means, each with a phase shift established by said phase iteration control means, and for applying the resulting multipath distortion corrected signal to said utilizing means.

13. An equalizer according to claim 12 wherein said predetermined time is a time equal to the duration of said burst, and said stored signals further include uncontaminated multipath distortion.

14. An equalizer according to claim 12 further comprising second control means coupled to said memory means, to said multipath delay determining means, and to said second coupling means for forming further multipath error signals at the output of said summing means, and further for controlling said phase iteration control means for selecting for each of said further multipath error signals that value of phase shift for which said other components have the least absolute magnitude, whereby said multipath distortion corrected signal is corrected for multiple multipath distortions.

15. An equalizer according to claim 12 wherein:
said first coupling means further comprises clipping means for clipping peak values of said subtracted signal for reducing a tendency towards regeneration.

16. An equalizer according to claim 12 further comprising:
attenuation means coupled to said controllable phase-shifting means for attenuating each of said phase-shifted delayed signals; and
attenuation control means coupled to said attenuation means and to said memory means for recurrently reading said stored signals from said memory means to said subtraction means and for applying to said inverting input terminal of said subtraction means multipath error signals the attenuation of which is selected for minimum magnitude of said other components.

17. A burst communication receiver for a transmission path which is subject to multipath distortion, comprising:
memory means for storing each received burst and related multipath distortion components received within a predetermined time following each burst to form stored signals;
multipath delay determining means coupled to said memory means for performing correlation of said stored signals for determining the relative delay associated with at least one multipath distortion component from among said related multipath distortion components;
multipath distortion regenerating means coupled to said multipath delay determining means for generating from signals applied thereto and from said relative delay an approximation to said at least one multipath distortion component;
subtracting means coupled to said memory means and to said multipath distortion regenerating means for subtracting said approximation from said stored signal to produce a subtracted signal and for applying said subtracted signal as an input to said multipath distortion regenerating means;
signal quality determining means coupled to said subtracting means for generating a signal representative of the quality of said subtracted signal; and
weighting means coupled to said signal quality determining means and to said multipath distortion regenerating means for weighting said approximation in a manner which maximizes said signal representative of said quality of said subtracted signal.

18. A receiver according to claim 17 wherein said signal quality determining means comprises:
frequency multiplying means coupled to said subtracting means for frequency multiplying said subtracted signal for generating frequency multiplied carrier and other components;
filter means coupled to said frequency multiplying means for passing said other components; and
detection means coupled to said filter means for detecting said other components to generate said signal representative of the quality of said subtracted signal.

19. A receiver according to claim 17 further comprising amplitude limiting means coupled to said subtracting means for amplitude limiting said subtracted signal.

20. A receiver according to claim 17 wherein said multipath distortion regenerating means comprises:
delay means coupled to said subtracting means for receiving said subtracted signal therefrom and for generating at least one delayed replica of said subtracted signal;
phase shifting means coupled to said delay means for phase-shifting each said delayed replica to form at least one phase-shifted replica; and
summing means coupled to said phase-shifting means and to said subtracting means for adding said phase shifted replica to any additional phase shifted replicas to generate said approximation to said at least one multipath distortion component.

* * * * *